(12) United States Patent
Abraham et al.

(10) Patent No.: US 9,089,002 B2
(45) Date of Patent: Jul. 21, 2015

(54) EFFICIENT GROUP ID MANAGEMENT FOR WIRELESS LOCAL AREA NETWORKS (WLANS)

(75) Inventors: Santosh Paul Abraham, San Diego, CA (US); Sameer Vermani, San Diego, CA (US); Maarten Menzo Wentink, Naarden (NL); Rahul Tandra, San Diego, CA (US); Hemanth Sampath, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 843 days.

(21) Appl. No.: 13/107,017

(22) Filed: May 13, 2011

(65) Prior Publication Data

US 2012/0120931 A1 May 17, 2012

Related U.S. Application Data

(60) Provisional application No. 61/345,140, filed on May 16, 2010, provisional application No. 61/366,493, filed on Jul. 21, 2010, provisional application No. 61/372,783, filed on Aug. 11, 2010, provisional application No. 61/382,859, filed on Sep. 14, 2010.

(51) Int. Cl.
*H04W 4/00* (2009.01)
*H04W 84/12* (2009.01)
*H04W 72/12* (2009.01)
*H04B 7/04* (2006.01)
*H04W 4/08* (2009.01)

(52) U.S. Cl.
CPC ............ *H04W 84/12* (2013.01); *H04B 7/0452* (2013.01); *H04W 72/121* (2013.01); *H04W 4/08* (2013.01); *Y02B 60/50* (2013.01)

(58) Field of Classification Search
None
See application file for complete search history.

(56) References Cited

U.S. PATENT DOCUMENTS

| 7,986,742 | B2 | 7/2011 | Ketchum et al. |
| 2005/0047384 | A1 | 3/2005 | Wax et al. |
| 2005/0090264 | A1 | 4/2005 | Kim |

(Continued)

FOREIGN PATENT DOCUMENTS

| CN | 1799200 A | 7/2006 |
| CN | 1826762 A | 8/2006 |

(Continued)

OTHER PUBLICATIONS

I.L. Shakya, et al. "High User Capacity Collaborative Code-Division Multiple Access," The Institute of Engineering & Technology (2011), IET Commun., vol. 5, Issue 3, pp. 307-319.

(Continued)

*Primary Examiner* — Andrew Lai
*Assistant Examiner* — Leon Andrews

(57) ABSTRACT

Certain aspects of the present disclosure provide techniques and apparatus for efficiently managing overloaded group IDs for groups of stations (STAs) receiving simultaneous transmission in a multiuser multiple-input multiple-output (MU-MIMO) scheme. In this manner, overloading for some of the groups may allow flexibility at an access point (AP) to trade off between support for more STA combinations and power savings. As disclosed herein, the group ID management scheme may be flexible enough to support APs with both overloaded and non-overloaded groups and APs with only non-overloaded groups. This scheme also achieves these benefits for overloading with a low overhead.

76 Claims, 21 Drawing Sheets

(56) References Cited

U.S. PATENT DOCUMENTS

| | | | |
|---|---|---|---|
| 2007/0211678 A1 | 9/2007 | Li et al. | |
| 2009/0305711 A1 | 12/2009 | Rinne et al. | |
| 2010/0203882 A1 | 8/2010 | Frenger et al. | |
| 2010/0260159 A1 | 10/2010 | Zhang et al. | |
| 2010/0296459 A1 | 11/2010 | Miki et al. | |
| 2010/0309834 A1 | 12/2010 | Fischer et al. | |
| 2011/0002219 A1* | 1/2011 | Kim et al. | 370/203 |
| 2011/0003598 A1 | 1/2011 | Ma et al. | |
| 2011/0034197 A1* | 2/2011 | Novak | 455/509 |
| 2011/0064040 A1 | 3/2011 | Kim et al. | |
| 2011/0075607 A1 | 3/2011 | Kim et al. | |
| 2011/0103280 A1* | 5/2011 | Liu et al. | 370/311 |
| 2012/0039266 A1 | 2/2012 | Abraham et al. | |
| 2013/0070748 A1 | 3/2013 | Abraham et al. | |
| 2013/0121234 A1* | 5/2013 | Shrivastava et al. | 370/312 |

FOREIGN PATENT DOCUMENTS

| | | |
|---|---|---|
| CN | 101222267 A | 7/2008 |
| EP | 1662677 A1 | 5/2006 |
| EP | 2106036 A1 | 9/2009 |
| EP | 2107707 A1 | 10/2009 |
| JP | 2005039728 A | 2/2005 |
| RU | 2008101664 A | 7/2009 |
| WO | WO-2004038988 A2 | 5/2004 |
| WO | WO-2006138625 A2 | 12/2006 |
| WO | WO-2007082252 | 7/2007 |
| WO | WO-2007102546 A1 | 9/2007 |
| WO | WO-2009026018 | 2/2009 |
| WO | WO2009121025 | 10/2009 |
| WO | WO2011057009 | 5/2011 |

OTHER PUBLICATIONS

Ping Wang, et al. "An Efficient Multi-User Detection Scheme for Overloaded Group-Othogonal MC-CDMA Systems," IEEE (2007), pp. 280-284.

Sameer Vermani, "Frame Format for GroupID Management," IEEE 802.11-10/128r1 (Nov. 2010), 7 pages.

Joonsuk Kim, et al. "Bits Consideration for SIGNAL Fields," IEEE 802.11-10/0382r0 (Mar. 2010), 12 pages.

International Search Report and Written Opinion—PCT/US2011/036695—ISA/EPO—Aug. 8, 2011.

Kim et al., "GroupID Concept for Downlink MU-MIMO Transmission", Jan. 18, 2010, pages SLIDE 1-SLIDE 8, XP00265417, Retrieved from the Internet: URL:https://mentor.ieee.org/.../11-10-0073-00-00ac-group-id-concept-for-dl-mu-mimo.ppt [retrieved on Jun. 28, 2011].

Miguel, et al., "On Overload Vector Precoding for Single-User MIMO Channels," IEEE Transactions on Wireless Communications, vol. 9 No. 2 (Feb. 2010).

Stacey et al., "Proposed Specification Framework edits for preamble structure and A-MPDU", IEEE 802.11-09/0992R3, Jan. 21, 2010, pp. 1-7, XP002652702, p. 4-p. 5.

Wang, et al., "Adaptive Downlink Multi-User MIMO Wireless Systems for Correlated Channels with Imperfect CSI," IEEE Transactions on Wireless Communications, vol. 5, No. 9 (Sep. 2006).

Kim J., et al., "GroupID Concept for Downlink MU-MIMO Transmission", IEEE 802.11-10/0073r2, Mar. 2010.

Kim J., et a., "GroupID Concept for Downlink MU-MIMO Transmission", IEEE 802.11-10/0073R0, Jan. 18, 2010, pp. 1-8, XP002652701, the whole document.

Lee D. et al., "MU-MIMO STA Scheduling Strategy and Related PHY Signaling", IEEE 802.11-10/0362r2, Mar. 2010, 15 slide.

Partial European Search Report—EP14020062—Search Authority—Munich—Oct. 10, 2014.

* cited by examiner

1100

| GROUP # (1102) | STA positions (1104) | | | |
|---|---|---|---|---|
| | 1 | 2 | 3 | 4 |
| 1 | X | | | |
| 2 | | | X | |
| 3 | | X | | |
| 4 | | | | X |
| ⋮ | | | | |
| 31 | | X | | |
| 32 | | | | X |

| Power save GroupID | STA positions (1104) | | | |
|---|---|---|---|---|
| | 1 | 2 | 3 | 4 |
| 35 | | X | | |
| 50 | | | | X |
| 63 | X | | | |

1402 { (rows 35, 50, 63)

FIG. 14

EFFICIENT GROUP ID MANAGEMENT FOR WIRELESS LOCAL AREA NETWORKS (WLANS)

CROSS-REFERENCE TO RELATED APPLICATIONS

This application claims benefit of U.S. Provisional Patent Application Ser. No. 61/345,140, filed May 16, 2010, U.S. Provisional Patent Application Ser. No. 61/366,493, filed Jul. 21, 2010, U.S. Provisional Patent Application Ser. No. 61/372,783, filed Aug. 11, 2010, and U.S. Provisional Patent Application Ser. No. 61/382,859, filed Sep. 14, 2010, all of which are herein incorporated by reference.

BACKGROUND

1. Field

Certain aspects of the present disclosure generally relate to wireless communications and, more particularly, to efficiently managing group IDs with overloading for at least some of the groups of stations (STAs) receiving simultaneous downlink transmission in a downlink multiuser multiple-input multiple-output (MU-MIMO) scheme.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure generally apply to a wireless local area network (WLAN) where an access point (AP) has data to send to multiple stations (STAs). By using the Downlink Spatial Division Multiple Access (DL-SDMA) technique, the AP may send data at the same time towards multiple STAs. Certain aspects of the present disclosure generally relate to efficiently managing group IDs with overloading for at least some of the groups of STAs (or other apparatuses) receiving simultaneous downlink transmission in a downlink multiuser multiple-input multiple-output (MU-MIMO) scheme.

Certain aspects of the present disclosure provide a method for wireless communications. The method generally includes transmitting a message indicating whether each of a plurality of groups corresponds to only one or to more than one set of apparatuses, wherein each set of apparatuses is configured to receive simultaneous transmissions; transmitting spatial stream positions for one of the apparatuses, wherein one of the spatial stream positions is associated with each of the groups; and transmitting at least one of the simultaneous transmissions for one of the groups based on the spatial stream positions for the one of the apparatuses.

Certain aspects of the present disclosure provide an apparatus for wireless communications. The apparatus generally includes a transmitter configured to transmit a message indicating whether each of a plurality of groups corresponds to only one or to more than one set of apparatuses, wherein each set of apparatuses is configured to receive simultaneous transmissions; transmit spatial stream positions for one of the apparatuses, wherein one of the spatial stream positions is associated with each of the groups; and transmit at least one of the simultaneous transmissions for one of the groups based on the spatial stream positions for the one of the apparatuses.

Certain aspects of the present disclosure provide an apparatus for wireless communications. The apparatus generally includes means for transmitting a message indicating whether each of a plurality of groups corresponds to only one or to more than one set of apparatuses, wherein each set of apparatuses is configured to receive simultaneous transmissions; means for transmitting spatial stream positions for one of the apparatuses, wherein one of the spatial stream positions is associated with each of the groups; and means for transmitting at least one of the simultaneous transmissions for one of the groups based on the spatial stream positions for the one of the apparatuses.

Certain aspects of the present disclosure provide a computer-program product for wireless communications. The computer-program product generally includes a computer-readable medium comprising instructions executable to transmit a message indicating whether each of a plurality of groups corresponds to only one or to more than one set of apparatuses, wherein each set of apparatuses is configured to receive simultaneous transmissions; transmit spatial stream positions for one of the apparatuses, wherein one of the spatial stream positions is associated with each of the groups; and transmit at least one of the simultaneous transmissions for one of the groups based on the spatial stream positions for the one of the apparatuses.

Certain aspects of the present disclosure provide an access point. The access point generally includes at least one antenna; a transmitter configured to transmit, via the at least one antenna, a message indicating whether each of a plurality of groups corresponds to only one or to more than one set of apparatuses, wherein each set of apparatuses is configured to receive simultaneous transmissions; transmit, via the at least one antenna, spatial stream positions for one of the apparatuses, wherein one of the spatial stream positions is associated with each of the groups; and transmit, via the at least one antenna, at least one of the simultaneous transmissions for one of the groups based on the spatial stream positions for the one of the apparatuses.

Certain aspects of the present disclosure provide a method for wireless communications. The method generally includes receiving, at an apparatus, a message indicating whether a group corresponds to only one or to more than one set of apparatuses, wherein each set of apparatuses is configured to receive simultaneous transmissions; receiving, at the apparatus, a group identifier and a spatial stream position for the apparatus in the group indicated by the group identifier; and using the spatial stream position to parse the received simultaneous transmissions.

Certain aspects of the present disclosure provide an apparatus for wireless communications. The apparatus generally includes a receiver configured to receive a message indicating whether a group corresponds to only one or to more than one set of apparatuses, wherein each set of apparatus is configured to receive simultaneous transmissions and wherein the receiver is further configured to receive a group identifier and a spatial stream position for the apparatus in the group indicated by the group identifier; and a processing system configured to use the spatial stream position to parse the received simultaneous transmissions.

Certain aspects of the present disclosure provide an apparatus for wireless communications. The apparatus generally includes means for receiving a message indicating whether a group corresponds to only one or to more than one set of apparatuses, wherein each set of apparatuses is configured to receive simultaneous transmissions and wherein the means for receiving is configured to receive a group identifier and a spatial stream position for the apparatus in the group indicated by the group identifier; and means for using the spatial stream position to parse the received simultaneous transmissions.

Certain aspects of the present disclosure provide a computer-program product for wireless communications. The computer-program product generally includes a computer-readable medium comprising instructions executable to receive, at an apparatus, a message indicating whether a group corresponds to only one or to more than one set of apparatuses, wherein each set of apparatuses is configured to receive simultaneous transmissions; receive, at the apparatus, a group identifier and a spatial stream position for the apparatus in the group indicated by the group identifier; and use the spatial stream position to parse the received simultaneous transmissions.

Certain aspects of the present disclosure provide a wireless node. The wireless node generally includes at least one antenna; a receiver configured to receive, at the wireless node via the at least one antenna, a message indicating whether a group corresponds to only one or to more than one set of wireless nodes, wherein each set of wireless nodes is configured to receive simultaneous transmissions and wherein the receiver is further configured to receive a group identifier and a spatial stream position for the wireless node in the group indicated by the group identifier; and a processing system configured to use the spatial stream position to parse the received simultaneous transmissions.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 11 illustrates example contents of a unicast message transmitted from an AP to a particular user terminal with a default spatial stream position for the user terminal in each of 32 groups, in accordance with certain aspects of the present disclosure.

FIG. 14 illustrates example contents of a unicast message transmitted from an AP to a particular user terminal with a spatial stream position for the user terminal in each power savings group, in accordance with certain aspects of the present disclosure.

DETAILED DESCRIPTION

Figure 1:
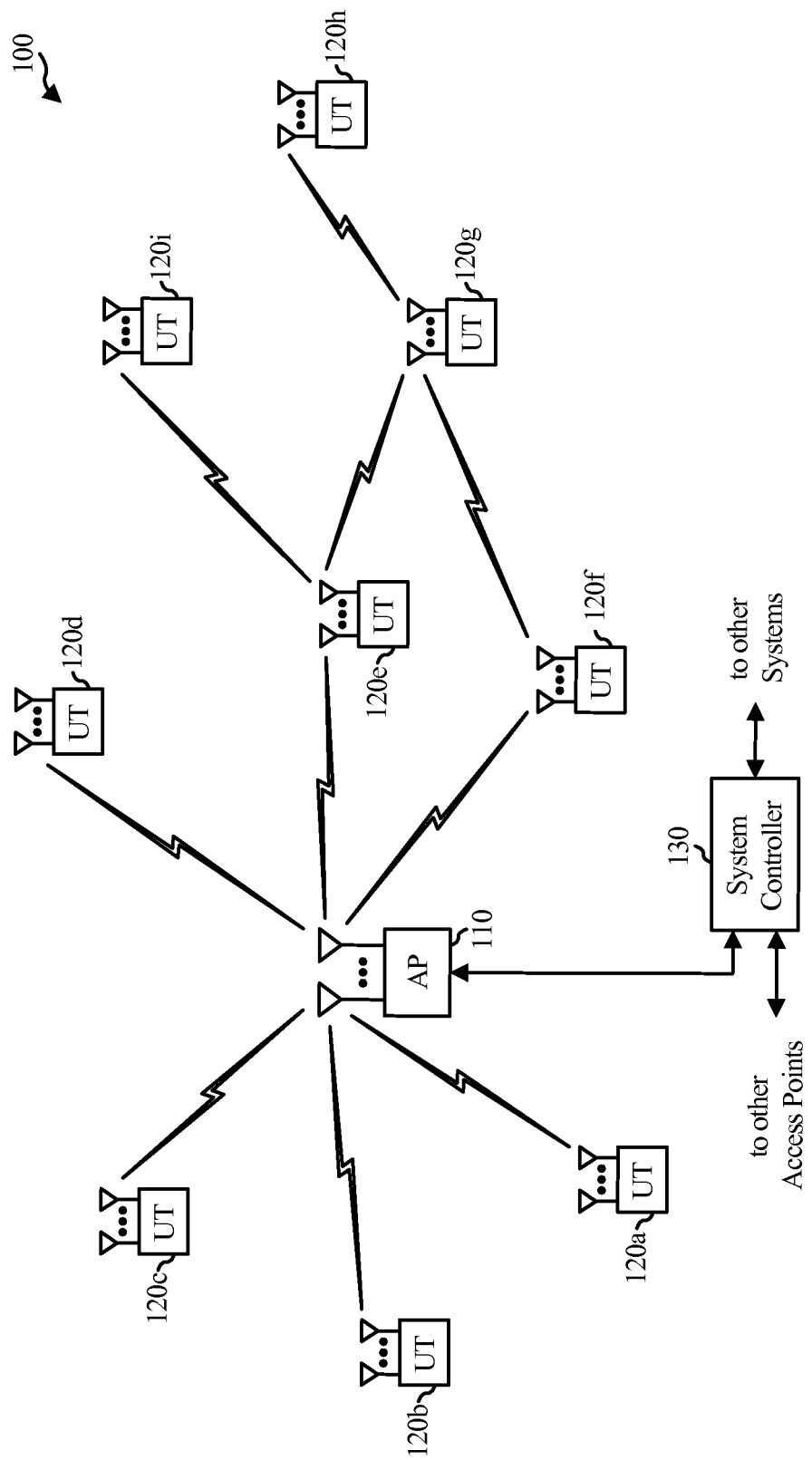
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
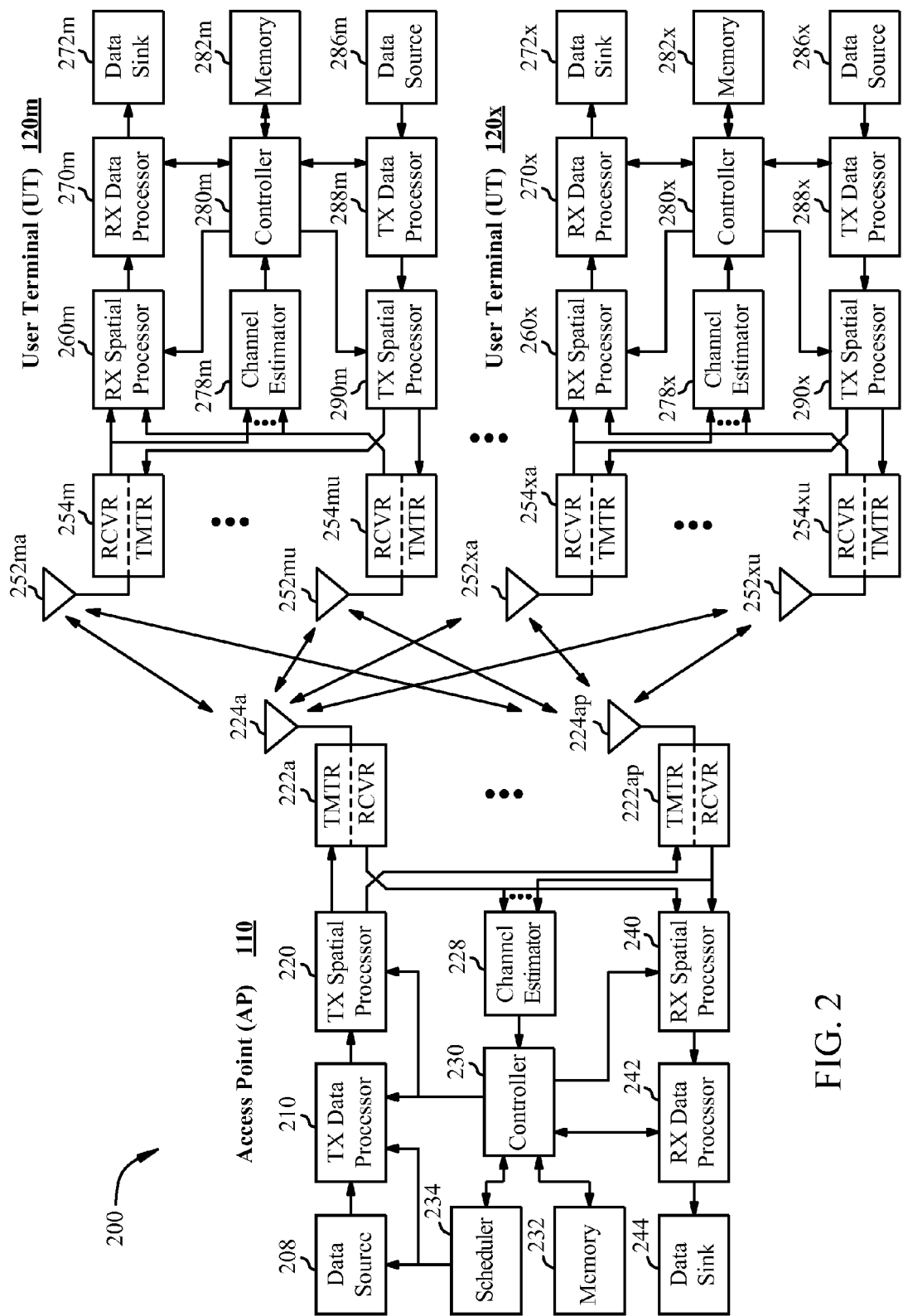
FIG. 2 illustrates a block diagram of an example access point and user terminals in a wireless communications network in accordance with certain aspects of the present disclosure.

FIG. 2 illustrates a block diagram of access point 110 and two user terminals 120$m$ and 120$x$ in the MIMO system 100. The access point 110 is equipped with $N_t$ antennas 224$a$ through 224$t$. User terminal 120$m$ is equipped with $N_{ut,m}$ antennas 252$ma$ through 252$mu$, and user terminal 120$x$ is equipped with $N_{ut,x}$ antennas 252$xa$ through 252$xu$. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224$a$ through 224$ap$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
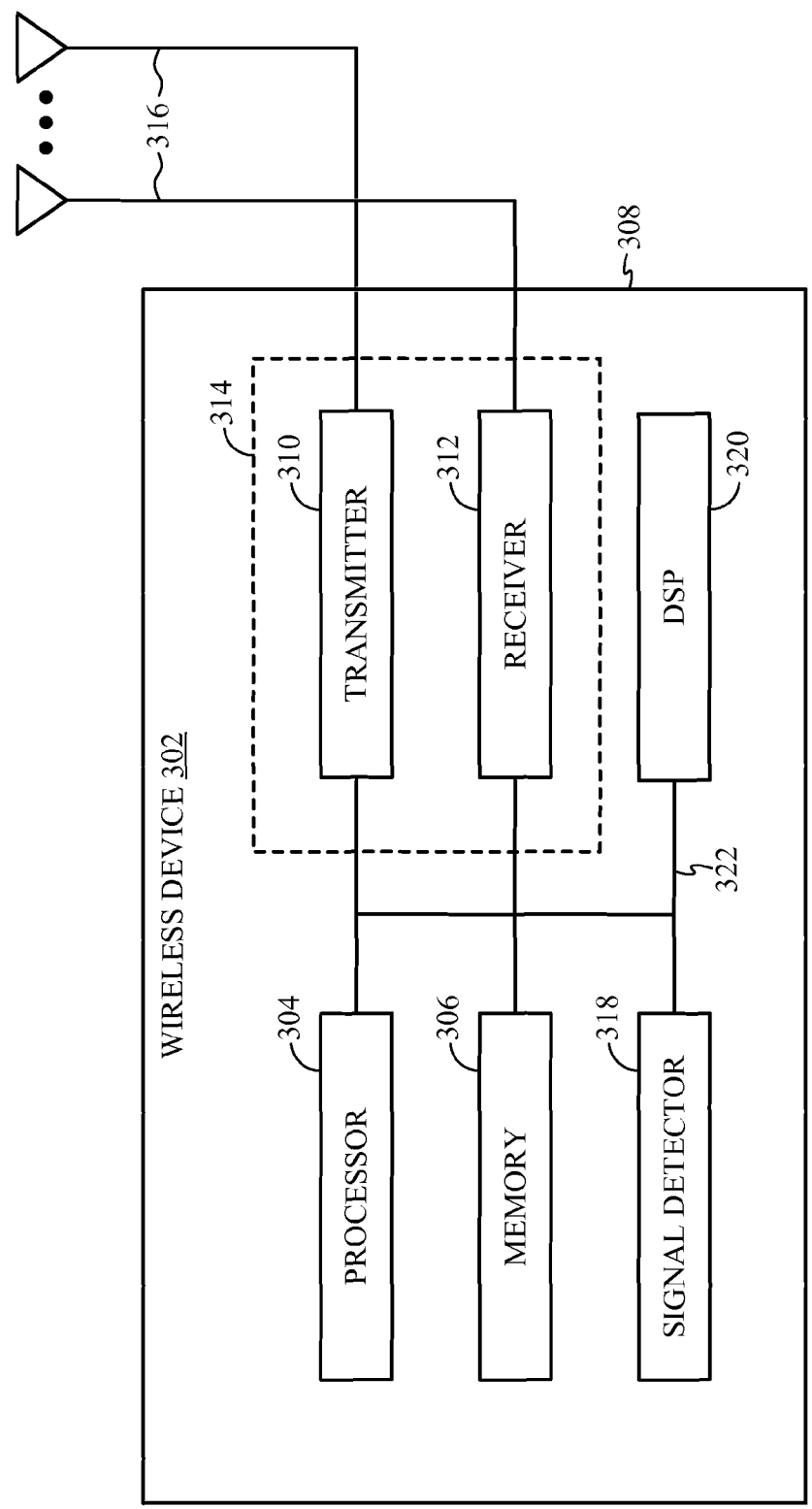
FIG. 3 illustrates a block diagram of an example wireless device in accordance with certain aspects of the present disclosure.

FIG. 3 illustrates various components that may be utilized in a wireless device 302 that may be employed within a wireless communication system, such as the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In next generation WLANs, such as the MIMO system 100 from FIG. 1, downlink (DL) multi-user (MU) MIMO transmission may represent a promising technique to increase overall network throughput. In most aspects of a DL MU-MIMO transmission, a non-beamformed portion of a preamble transmitted from an access point to a plurality of user stations (STAs) may carry a spatial stream allocation field indicating allocation of spatial streams to the STAs.

In order to parse this allocation information at a STA side, each STA may need to know its ordering or a STA number in a set of STAs from the plurality of STAs scheduled to receive the MU transmission. This may entail forming groups, wherein a group identification (ID) field in the preamble may convey, to the STAs, the set of STAs (and their order) being transmitted in a given MU transmission. With preamble bits adding to the transmission overhead, it may be desirable to expend as little bits on the group ID (sometimes written as "groupID" or "group_ID") as possible, while not sacrificing on the flexibility with which STAs can be scheduled together in a MU-MIMO transmission at a given instant.

Preamble Structure with Group Definition

Figure 4:
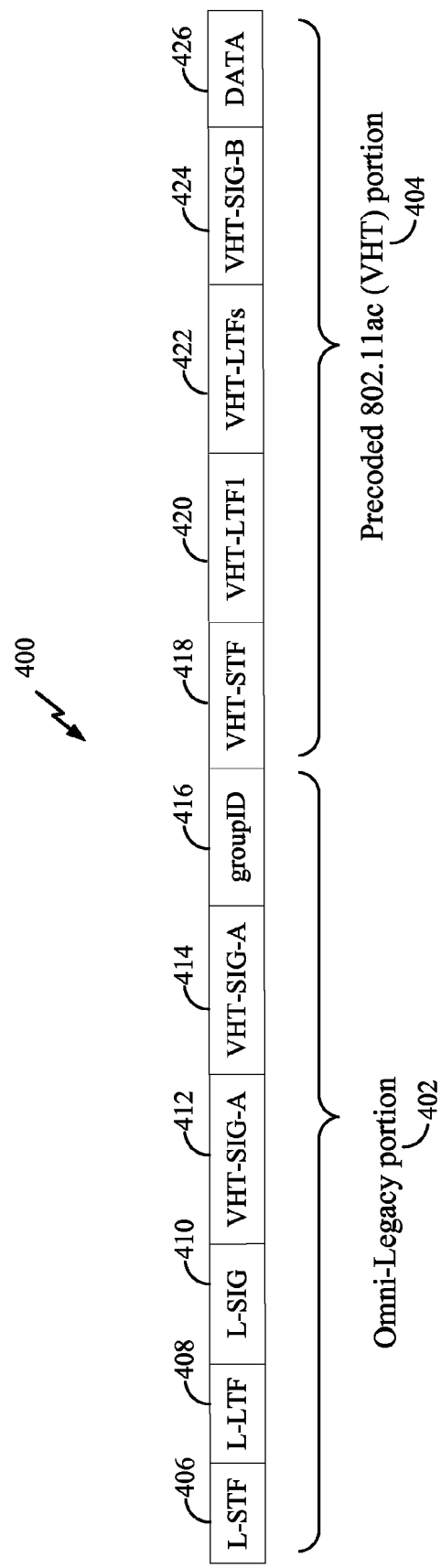
FIG. 4 illustrates an example structure of preamble transmitted from an access point in accordance with certain aspects of the present disclosure.

FIG. 4 illustrates an example structure of a preamble 400 in accordance with certain aspects of the present disclosure. The preamble 400 may be transmitted, for example, from the access point (AP) 110 to the user terminals 120 in the MIMO system 100 illustrated in FIG. 1.

The preamble 400 may comprise an omni-legacy portion 402 (i.e., the non-beamformed portion) and a precoded IEEE 802.11ac VHT (Very High Throughput) portion 404. The legacy portion 402 may comprise: a Legacy Short Training Field (L-STF) 406, a Legacy Long Training Field 408, a Legacy Signal (L-SIG) field 410, and two OFDM symbols for VHT Signal A (VHT-SIG-A) fields 412, 414. The VHT-SIG-A fields 412, 414 (i.e., VHT-SIG-A1 and VHT-SIG-A2) may be transmitted omni-directionally and may indicate allocation of numbers of spatial streams to a combination (set) of STAs.

The precoded IEEE 802.11ac VHT portion 404 may comprise a VHT Short Training Field (VHT-STF) 418, a VHT Long Training Field 1 (VHT-LTF1) 420, VHT Long Training Fields (VHT-LTFs) 422, a VHT Signal B (VHT-SIG-B) field 424, and a data portion 426. The VHT-SIG-B field may comprise one OFDM symbol and may be transmitted precoded/beamformed.

Robust MU-MIMO reception may involve the AP transmitting all VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

As aforementioned, a group ID field 416 may be included in the preamble 400 for certain aspects to convey to all supported STAs that a particular set of STAs will be receiving spatial streams of a MU-MIMO transmission. For other aspects, the group ID may be indicated as part of another field in the preamble 400, such as within the VHT-SIG-A fields 412, 414 (e.g., bits 4-9 in VHT-SIG-A1). As a baseline, if groups are formed which may be mapped to unique sets of STAs, a very large number of group ID bits within the preamble 400 may be involved for complete scheduling flexibility. On the other hand, if overloading of a group ID is allowed where multiple sets (combinations) of STAs may be mapped to one group ID, greater flexibility may be achieved in the number of STAs that can be scheduled together.

Example Efficient Group ID Management for WLANS

As described above, groups may be formed in DL MU-MIMO transmission for WLANs for conveying the spatial stream positions to STAs. Overloading—which generally refers to mapping one group ID to multiple STA combinations, as used herein—for some or all of the groups allows flexibility at the AP to trade off between support for more STA combinations and power saving. Ideally, a group ID management scheme should be flexible enough to support both overloaded and non-overloaded groups, as well as support APs with only non-overloaded groups. Accordingly, what is needed is a group ID management scheme that achieves the above objectives for overloading with a low overhead.

Figure 5:
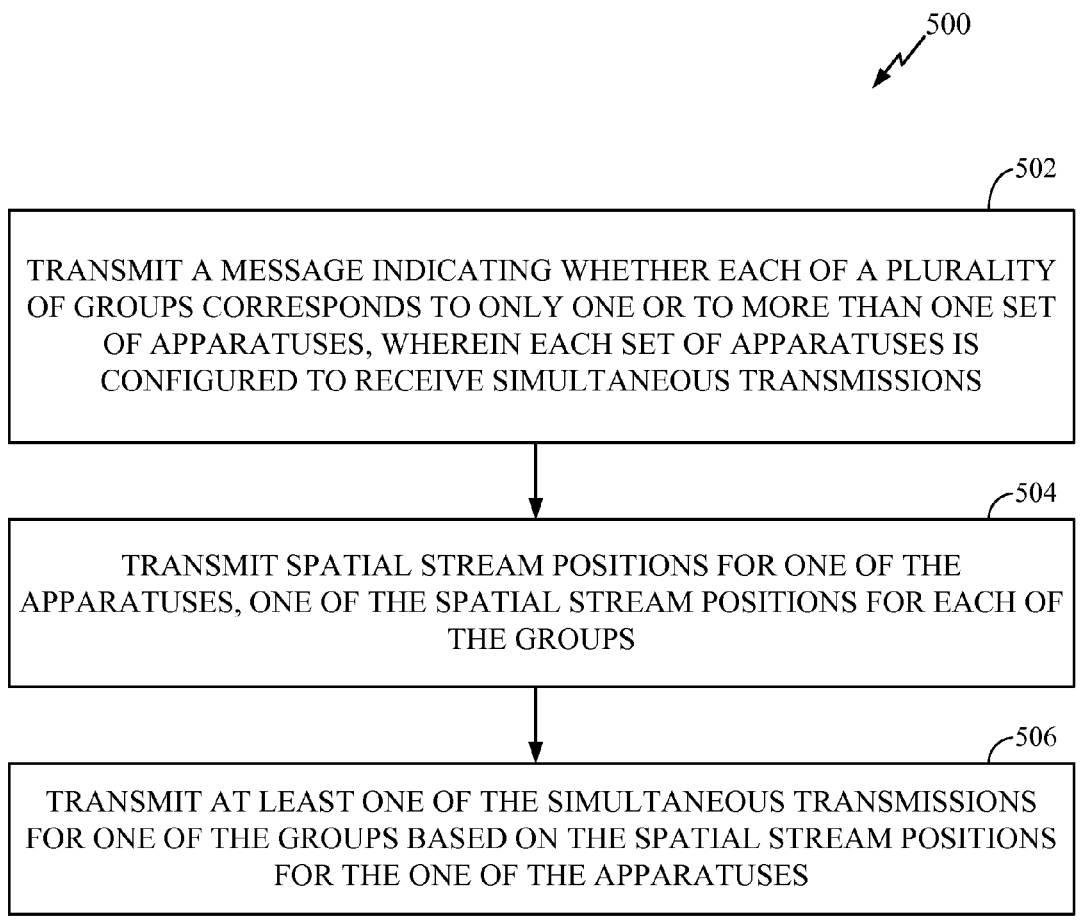
FIG. 5 illustrates example operations that may be performed at an access point (AP) to efficiently manage group IDs with overloading for at least some of the groups of apparatuses receiving simultaneous transmissions, in accordance with certain aspects of the present disclosure.

FIG. 5 illustrates example operations 500 that may be performed at an AP to efficiently manage group IDs with overloading for at least some of the groups of apparatuses receiving simultaneous transmissions, such as simultaneous downlink transmissions in a DL MU-MIMO scheme. The operations 500 may begin, at 502, by transmitting a message indicating whether each of a plurality of groups corresponds to only one set or to more than one set of apparatuses, wherein each set of apparatuses is configured to receive simultaneous transmissions. For certain aspects, the transmitted message may be a broadcast message or may be one of multiple messages transmitted to apparatuses (e.g., STAs) in a BSS. At 504, the AP may transmit spatial stream positions for one of the apparatuses, one of the spatial stream positions for each of the groups. For certain aspects, the AP may generate and transmit a frame for one of the plurality of apparatuses, wherein the frame may include the group identifier (e.g., a field containing a group identification, or group ID) and the spatial stream position for the one of the plurality of apparatuses in each of the plurality of groups. At 506, the AP may transmit at least one of the simultaneous transmissions for one of the groups based on the spatial stream positions for the one of the apparatuses. For certain aspects, the AP may transmit a group identifier indicating the one of the groups during association with the apparatus or to indicate a change to the overloading in the one of the groups.

For certain aspects, the message transmitted at 502 may comprise a beacon frame, a type of management frame in IEEE 802.11-based wireless local area networks (WLANs). Typically containing all the information about the network, beacon frames may be broadcasted periodically by the AP to announce the presence of the WLAN. The beacon frame may comprise a bitmap conveying the overloading status of the Basic Service Set (BSS), wherein the BSS refers to the AP together with all associated STAs. In other words, the bitmap may convey which groups are overloaded and which are non-overloaded, with one bit for each group, for example. For certain aspects, the bitmap value may equal 1 for overloaded groups and 0 for non-overloaded groups, or vice versa for other aspects. In the bitmap, bits for groups that are never used may be set to 0.

The group ID field may comprise y bits. Therefore, the bitmap may contain $2^y$ bits to have one bit for every group. For example, the group ID field may have 6 bits, and the bitmap may comprise 64 bits.

Figure 6:
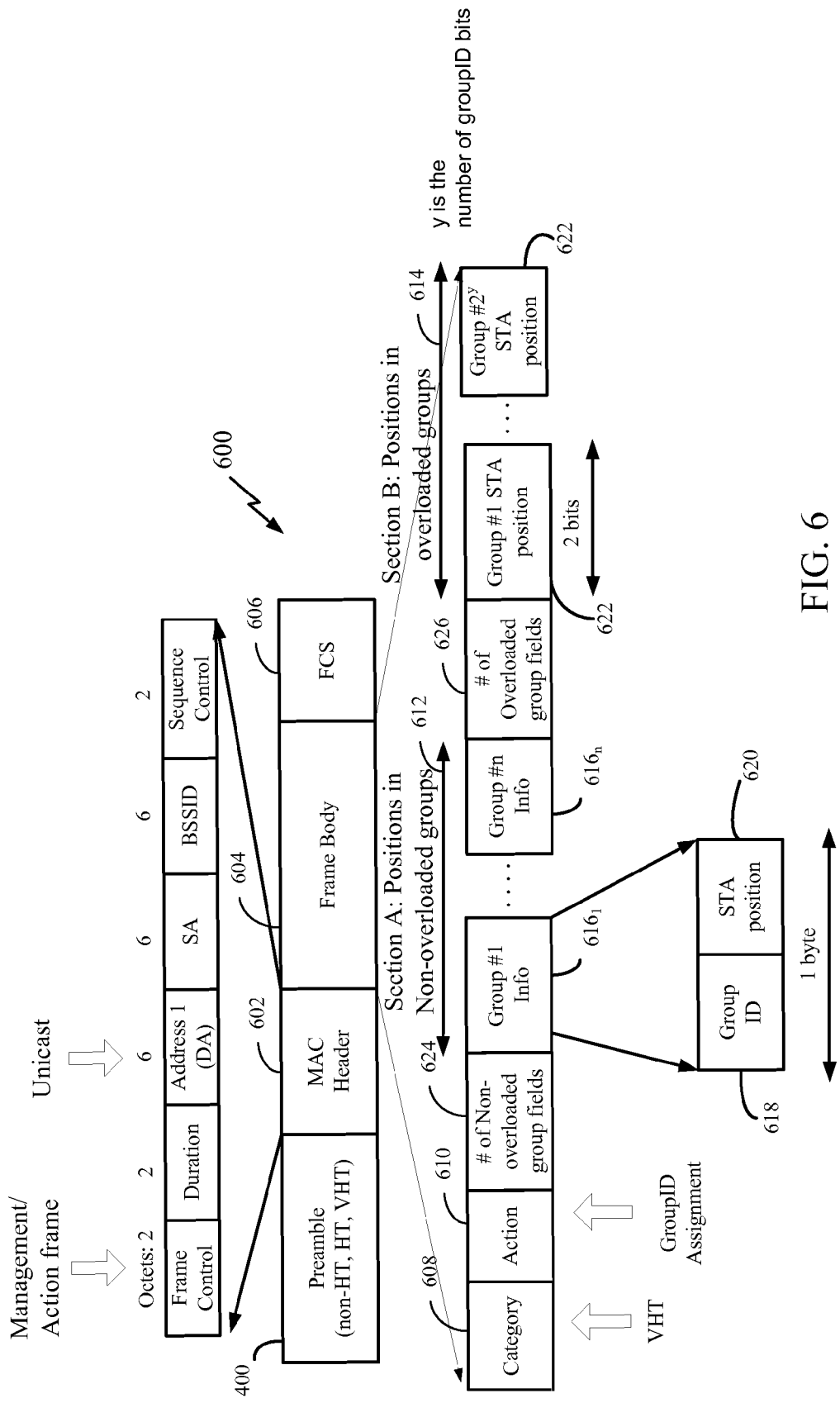
FIG. 6 illustrates an example unicast group ID assignment frame transmitted from an access point in accordance with certain aspects of the present disclosure.

For certain aspects, the frame generated and transmitted at 504 may comprise a unicast group ID assignment frame 600 as illustrated in FIG. 6. For certain aspects, the unicast group ID assignment frame 600 may be transmitted during association with a STA, such as a STA entering or re-entering a WLAN. The group ID assignment frame 600 may comprise a preamble 400, a media access control (MAC) header 602, a frame body 604, and a frame check sequence (FCS) 606. The frame body 604 may comprise a category field 608 indicating VHT and an action field 610 indicating that the information following the action field 610 is for a group ID assignment as depicted in FIG. 6.

The frame body 604 of the group ID assignment frame 600 may also comprise two sections: Section A 612 and Section B 614. Section A may indicate STA positions in non-overloaded groups (i.e., groups corresponding to only one set of STAs). Section A may be sent only to STAs who are members of a non-overloaded group. Section A may comprise up to n different bundles of group information 616, one set of group information for each of the non-overloaded groups. The group information 616 may comprise a group ID value 618 and a STA position 620 for the STA designated to receive the unicast group ID assignment frame 600. For certain aspects, the group ID value 618 may comprise 6 bits (the same as the group ID field 416), and the STA position 620 may comprise 2 bits representing four different positions within each group, leading to a total of 8 bits (i.e., 1 byte) for each bundle of group information 616.

Section B may indicate STA positions 622 for every group, not just the non-overloaded groups. Thus, if the group ID field 416 comprises y bits, Section B may include $2^y$ STA positions 622. Section B may be included in the unicast group ID assignment frame 600 whenever a group in the BSS is overloaded. Upon reception of the frame 600, a STA may use the STA positions allocated during association in Section B. For certain aspects, the STA positions 622 may each comprise 2 bits representing four different STA positions within each group. As an example, if y=6 such that there are 64 ($=2^6$) groups, Section B may comprise 128 bits (16 bytes).

The unicast group ID assignment frame 600 may also contain a field 624 indicating the number of non-overloaded group fields in Section A and a field 626 indicating the number of overloaded group fields in Section B. The values in fields 624 and 626 may most likely add up to the total number of groups being used by the AP.

In situations where a BSS has only non-overloaded groups, Section B 614 may be absent from the unicast group ID assignment frame 600. In such situations, the overloading bitmap in the beacon frame may contain all zeros.

Other than during association with a STA, the unicast group ID assignment frame 600 described above may also be transmitted when a group changes from being overloaded to being non-overloaded. In this case, Section A 612 may be transmitted to STAs who are members of the new non-overloaded group, without Section B 614 being included in the group ID assignment frame 600. Furthermore, the AP may turn off the bit (i.e., change the bit value from 1 to 0) for that new non-overloaded group in the overloading bitmap of the beacon frame or other (broadcast) message.

In contrast, when a group changes from being non-overloaded to being overloaded, just the message (e.g., the beacon frame) may be sufficient to indicate the change. In other words, the unicast group ID assignment frame 600 need not be sent in this case. The AP may turn on the bit (i.e., change the bit value from 0 to 1) in the (broadcast) message corresponding to the new overloaded group and transmit the message.

Figure 7:
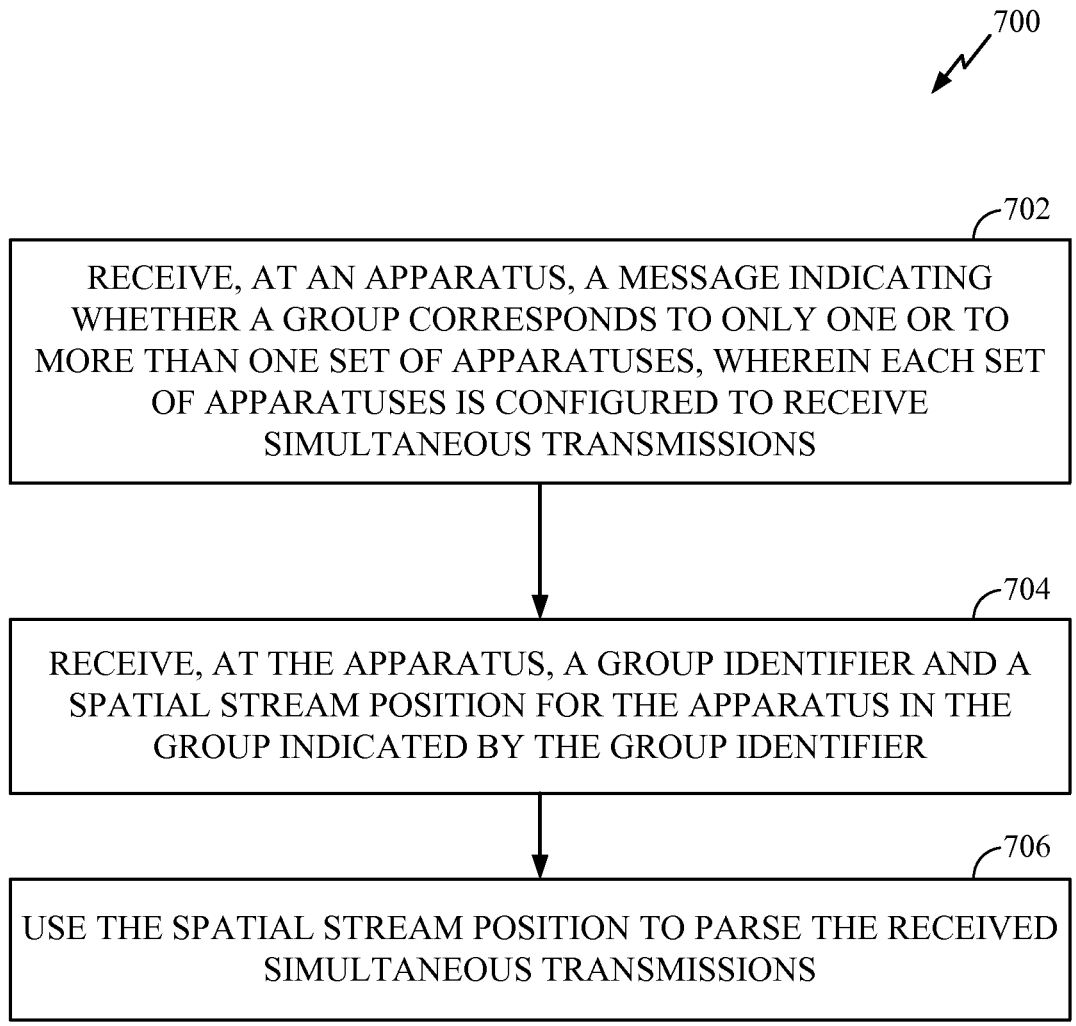
FIG. 7 illustrates example operations that may be performed at a user terminal to interpret group IDs with overloading for at least some of the groups of apparatuses receiving simultaneous transmissions, in accordance with certain aspects of the present disclosure.
Figure 7A:
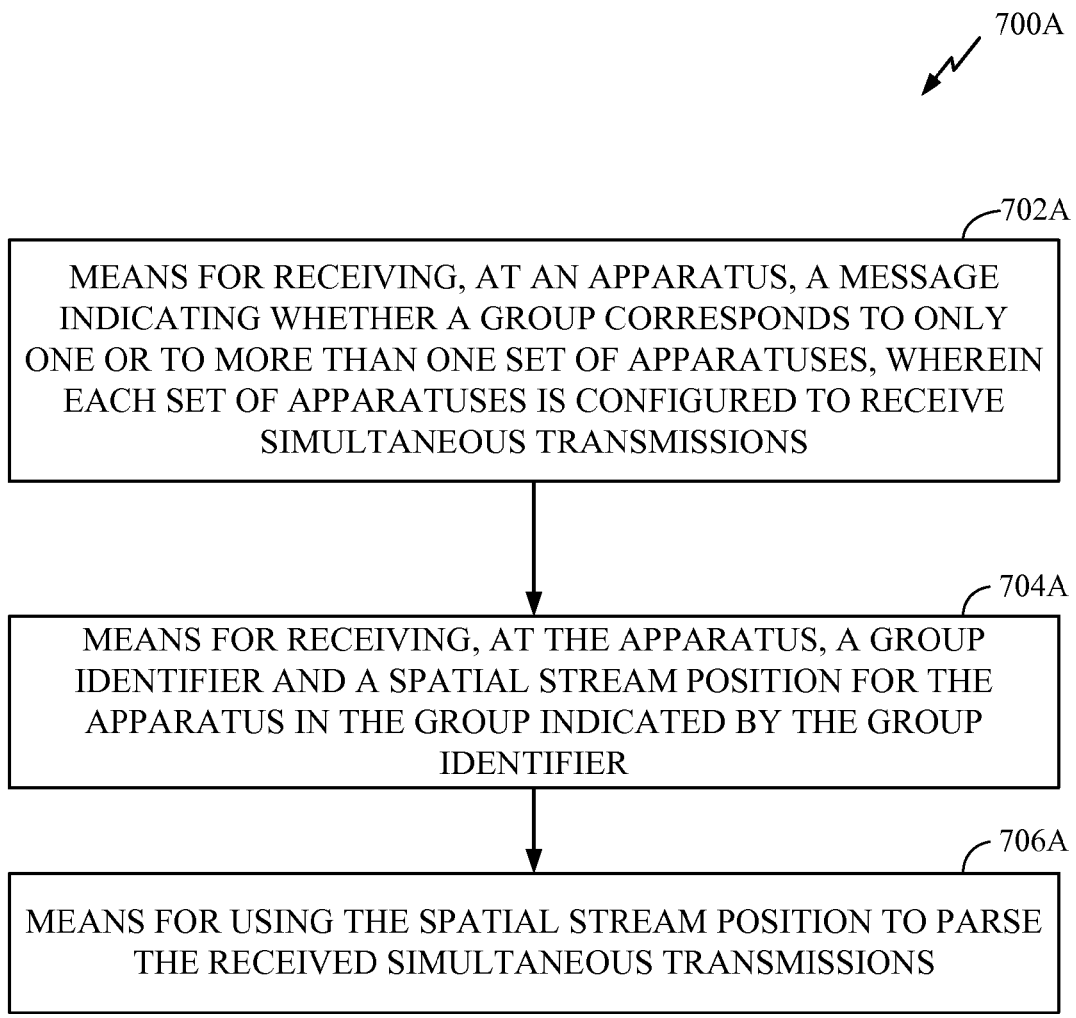
FIG. 7A illustrates example means capable of performing the operations shown in FIG. 7.

FIG. 7 illustrates example operations 700 that may be performed at a user terminal to interpret group IDs with overloading for at least some of the groups of apparatuses receiving simultaneous transmissions such as simultaneous downlink transmissions in a DL MU-MIMO scheme. The operations 700 may begin, at 702, by receiving, at an apparatus (e.g., a STA), a message indicating whether a group corresponds to only one or to more than one set of apparatuses, wherein each set of apparatuses is configured to receive simultaneous transmissions. For certain aspects, the received message may be a broadcast message or may be one of multiple messages transmitted to the apparatus. At 704, the apparatus may receive a group identifier and a spatial stream position for the apparatus in the group indicated by the group identifier. For certain aspects, the apparatus may receive a frame comprising the group identifier (e.g., a group ID field) indicating the group and the spatial stream position for the apparatus. At 706, the apparatus may use the spatial stream position to parse the received simultaneous transmissions. For certain aspects, the frame may comprise multiple spatial stream positions, one spatial stream position for the apparatus in each of the plurality of groups.

In this manner, overloading for some of the groups may be accomplished and may allow flexibility at the AP to trade off between support for more STA combinations and power saving. As disclosed herein, the group ID management scheme may be flexible enough to support APs with both overloaded and non-overloaded groups and APs with only non-overloaded groups. This scheme also achieves these benefits for overloading with a low overhead.

Example Group ID Management with Fully and Partially Overloaded Groups

As described above, a STA position in a group may be a number between 1 and 4 for a limit of 4 users per MU-MIMO transmission. The STA position may be used to parse the Nsts field. A fully overloaded group, as defined herein, generally refers to a group of STAs where every STA in the BSS has a STA position for the group. In fully overloaded groups, STAs cannot stop decoding the preamble 400 after decoding the VHT-SIG-A fields 412, 414. In contrast, a partially overloaded group, as defined herein, generally refers to a group of STAs where less than all the STAs (i.e., a subset of the STAs) in the BSS are assigned STA positions for the group. STAs which are not assigned spatial stream positions can stop decoding the preamble 400 after decoding the VHT-SIG-A fields 412, 414. Designating partially overloaded groups in this manner provides for power savings.

Figure 8:
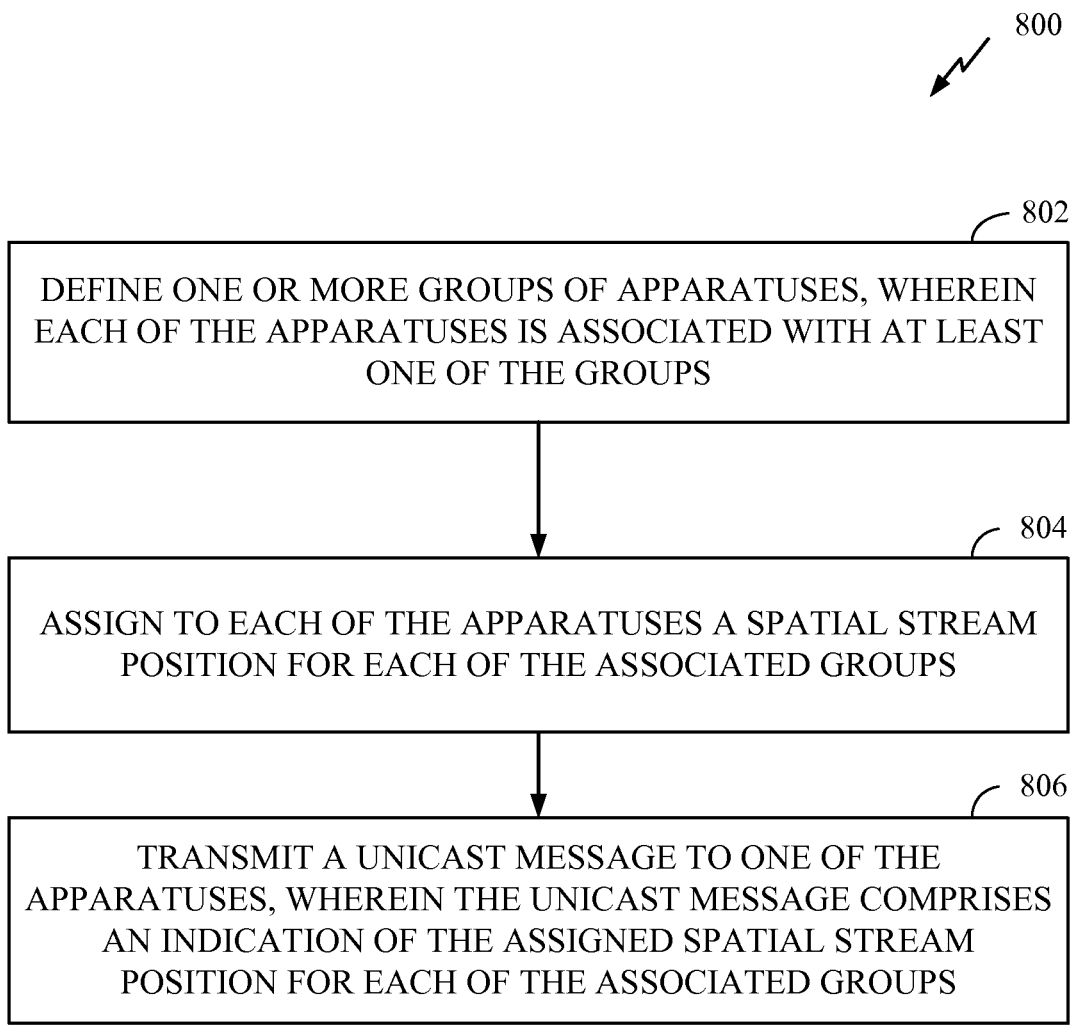
FIG. 8 illustrates example operations that may be performed at an AP to efficiently manage group IDs for groups of apparatuses receiving simultaneous transmissions, in accordance with certain aspects of the present disclosure.
Figure 8A:
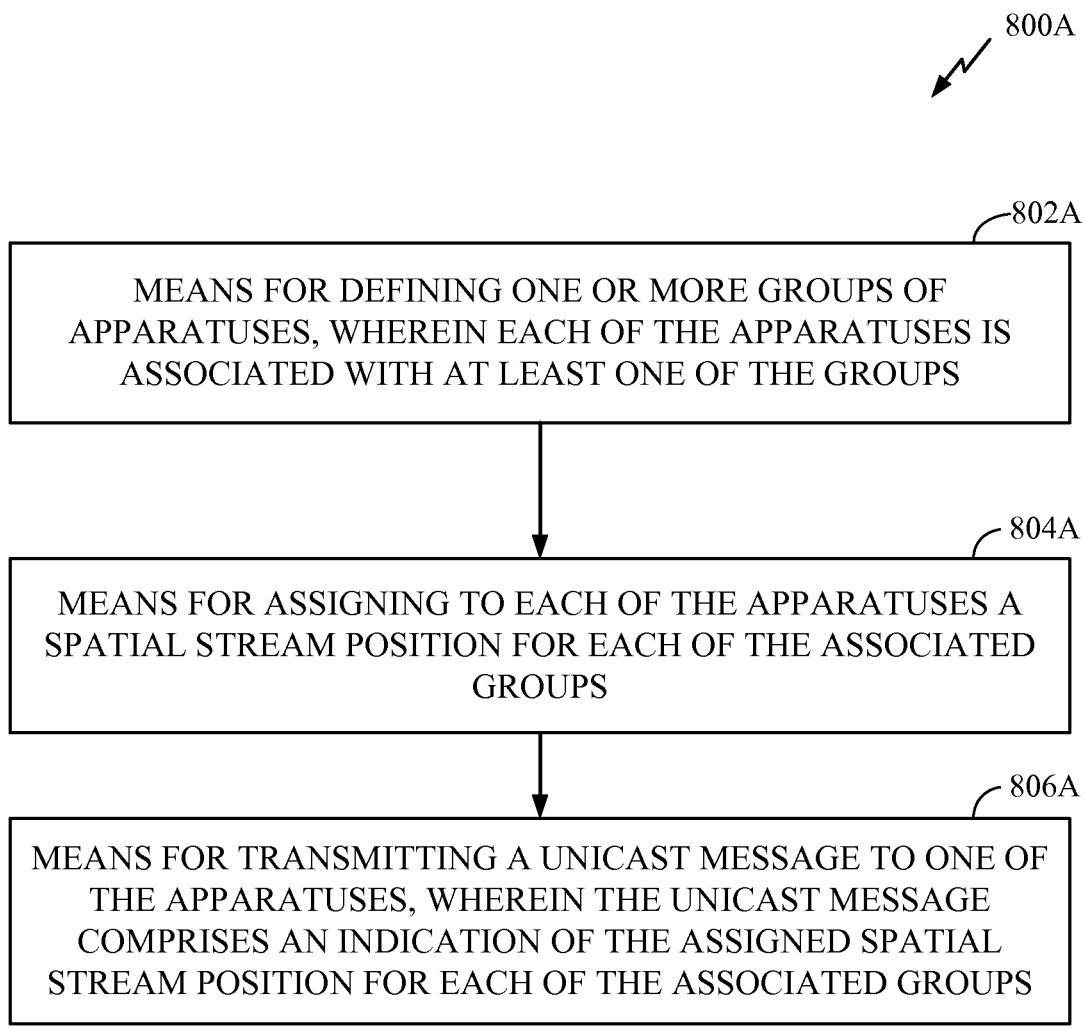
FIG. 8A illustrates example means for performing the operations shown in FIG. 8.

FIG. 8 illustrates example operations 800 that may be performed at an AP to efficiently manage group IDs for groups of apparatuses. The groups of apparatuses may receive simultaneous transmissions, such as simultaneous downlink transmissions in a DL MU-MIMO scheme.

The operations 800 may begin, at 802, by defining one or more groups of apparatuses, wherein each of the apparatuses is associated with at least one of the groups. The groups of apparatuses may be in a Basic Service Set (BSS). At 804, the AP may assign to each of the apparatuses a spatial stream position for each of the associated groups.

At 806, the AP may transmit a unicast message to one of the apparatuses, wherein the unicast message comprises an indication of the assigned spatial stream position for each of the associated groups. For certain aspects, the one or more groups may comprise at least one fully overloaded group comprising all the apparatuses in the BSS. For certain aspects, the one or more groups may further comprise one or more partially overloaded groups comprising less than all the apparatuses in the BSS, wherein the one of the apparatuses belongs to at least one of the partially overloaded groups The AP may transmit the simultaneously transmitted spatial streams for one of the groups of the apparatuses, based on the assigned spatial stream position for each of the apparatuses associated with the group.

Figure 9:
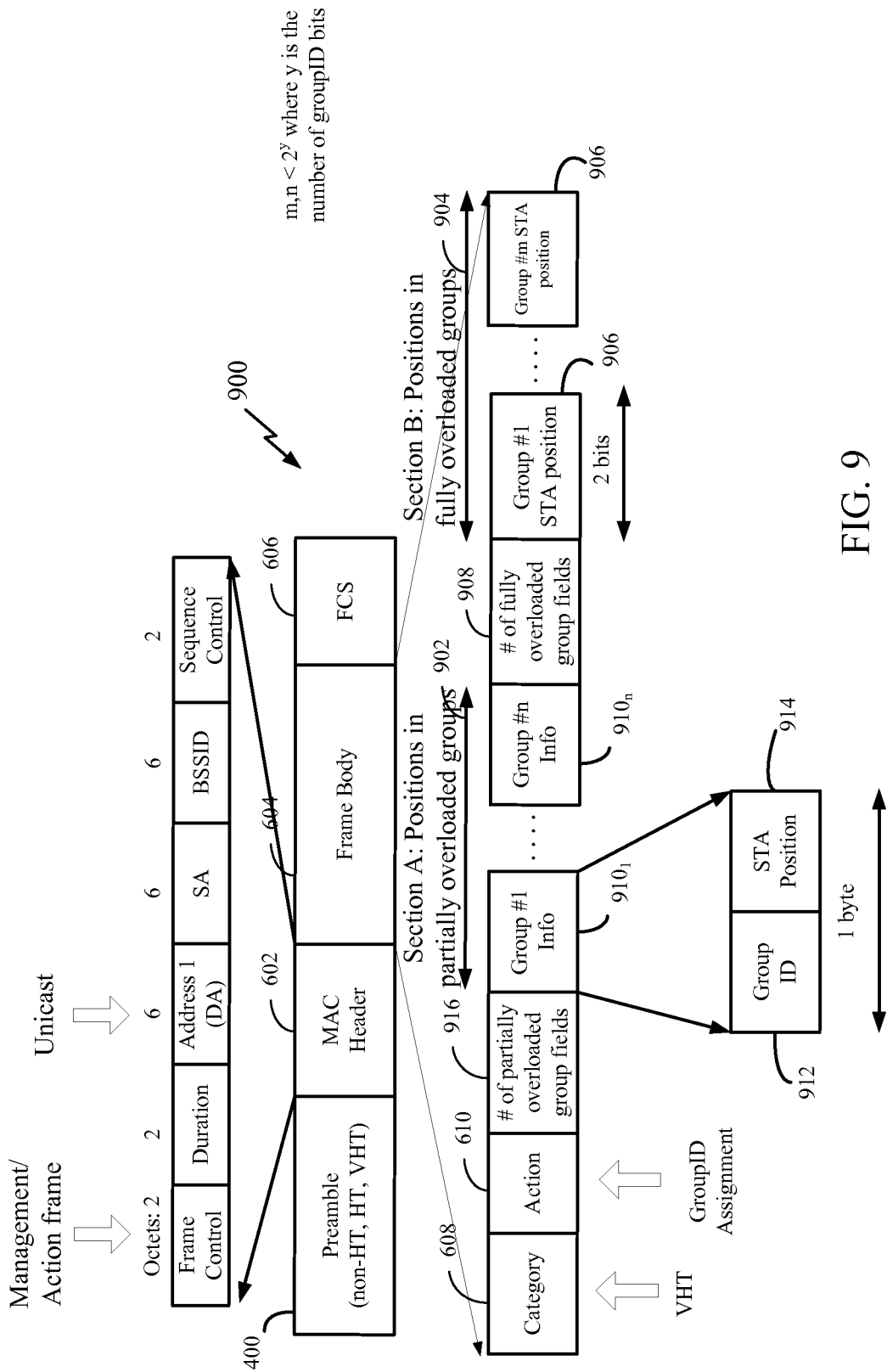
FIG. 9 illustrates an example unicast group ID assignment frame transmitted from an AP for fully overloaded and partially overloaded groups, in accordance with certain aspects of the present disclosure.

FIG. 9 illustrates an example unicast group ID assignment frame 900 transmitted from an AP for fully overloaded and partially overloaded groups, in accordance with certain aspects of the present disclosure. The assignment frame 900 may be similar to the assignment frame 600 described above with respect to FIG. 6. The frame body 604 of the unicast group ID assignment frame 900 may comprise two sections: Section A 902 and Section B 904.

Section A 902 may indicate STA positions in partially overloaded groups (i.e., groups corresponding to a subset of all the STAs in the BSS). Section A may be sent only to STAs who are members of a partially overloaded group. Section A may comprise up to n different bundles of group information 910, one set of group information for each of the partially overloaded groups. The group information 910 may comprise a group ID value 912 and a STA position 914 for the STA designated to receive the unicast group ID assignment frame 900. For certain aspects, the group ID value 912 may comprise 6 bits (the same as the group ID field 416), and the STA position 914 may comprise 2 bits representing four different positions within each group, leading to a total of 8 bits (i.e., 1 byte) for each bundle of group information 910.

For certain aspects, Section B 904 may indicate STA positions 906 for every group, not just the partially overloaded groups. Thus, if the group ID field 416 comprises y bits, Section B may include $2^y$ STA positions 906. For other aspects Section B may indicate STA positions 906 for only the fully overloaded groups. Upon reception of the frame 900, a STA may use the STA positions allocated during association in Section B 904. For certain aspects, the STA positions 906 may each comprise 2 bits representing four different STA positions within each group. As an example, if y=6 such that there are 64 (=$2^6$) groups, Section B 904 may comprise 128 bits (16 bytes).

The unicast group ID assignment frame 900 may also contain a field 916 indicating the number of partially overloaded group fields (i.e., the number of bundles of group information 910) in Section A and a field 908 indicating the number of overloaded group fields in Section B. The values in these fields 908, 916 may, in certain aspects, add up to the total number of groups being used by the AP.

In situations where a BSS has only fully overloaded groups, Section A 902 may be absent from the unicast group ID assignment frame 900.

The unicast group ID assignment frame 900 may be transmitted during association of a STA with the AP in the BSS. By transmitting the frame 900 during association, the group ID assignment frame 900 may convey at least the STA positions 906 in fully overloaded groups and may also convey the STA positions 914 if the STA is a member of any partially overloaded groups. The unicast group ID assignment frame 900 may also be transmitted when a group changes from fully overloaded to partially overloaded. In this latter case, Section A 902 may be transmitted only to STAs who are members of the new partially overloaded group.

Each MU-MIMO transmission may carry an overloading status bit in the VHT-SIG-A fields 412, 414. This overloading status bit may equal 1 if the group ID is being used in a fully overloaded transmission and 0 for a partially overloaded transmission. The AP may use the overloading status bit to indicate that a group has moved from partially overloaded to fully overloaded. In other words, the AP may turn OFF the overloading status bit while simultaneously transmitting the spatial streams using a group ID for a partially overloaded group. Whenever this partially overloaded group changes to a fully overloaded group, the AP indicates this by turning ON the overloading status bit while simultaneously transmitting the spatial streams using that group ID. Changing from a partially overloaded to a fully overloaded group can occur when one or more STAs who were not members of a partially overloaded group leave the BSS, such that all of the STAs remaining in the BSS belong to the group.

Overloading for some of the groups may provide flexibility at the AP to trade off between support for increased STA combinations and power savings. Group ID management may be flexible enough to support APs with fully overloaded and partially-overloaded groups and APs with only non-overloaded groups. The group ID management solutions described above achieve these objectives with a low messaging overhead.

Example Group ID Management Schemes

As described above, the group ID field 416 has many uses. Certain aspects of the present disclosure also provide various group ID management processes. For certain aspects, support for nearly all STA combinations (e.g., a 6-bit group ID) may be enabled through a one-time message at association, providing low messaging overhead. Furthermore, an optional power savings may be enabled at the STAs through unicast (and hence, robust) messaging to a small subset of STAs.

Allocation of Default Spatial Stream Positions

Figure 10:
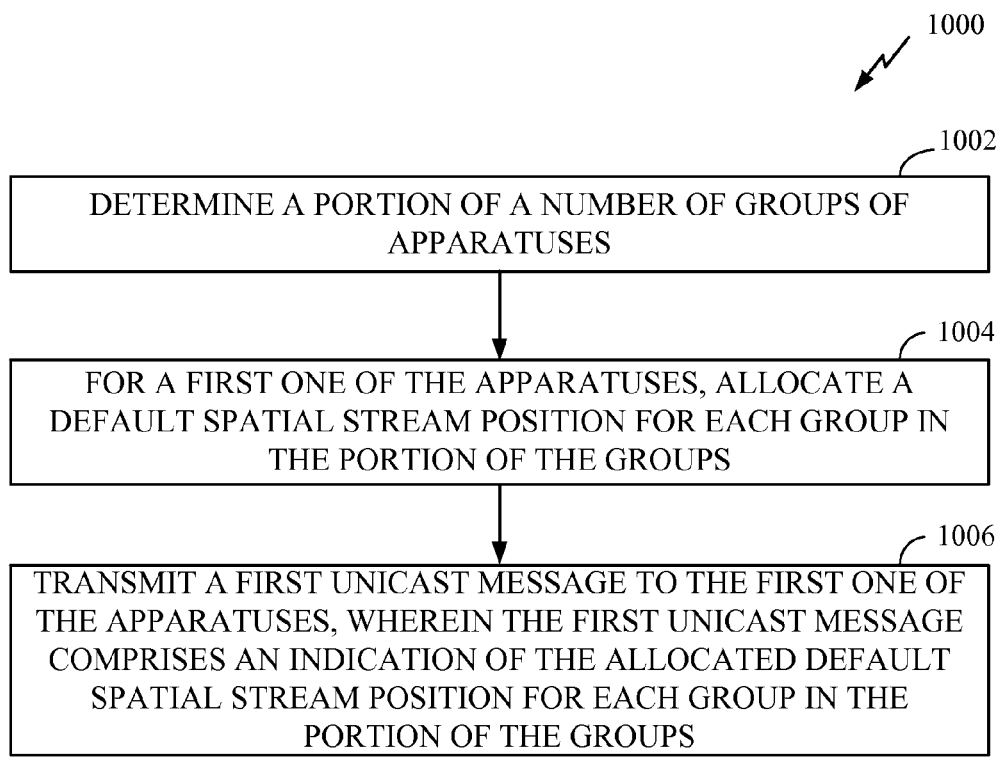
FIG. 10 illustrates example operations that may be performed at an AP to efficiently manage groups of apparatuses receiving simultaneously transmitted spatial streams using default spatial stream positions for a portion of the groups, in accordance with certain aspects of the present disclosure.
Figure 10A:
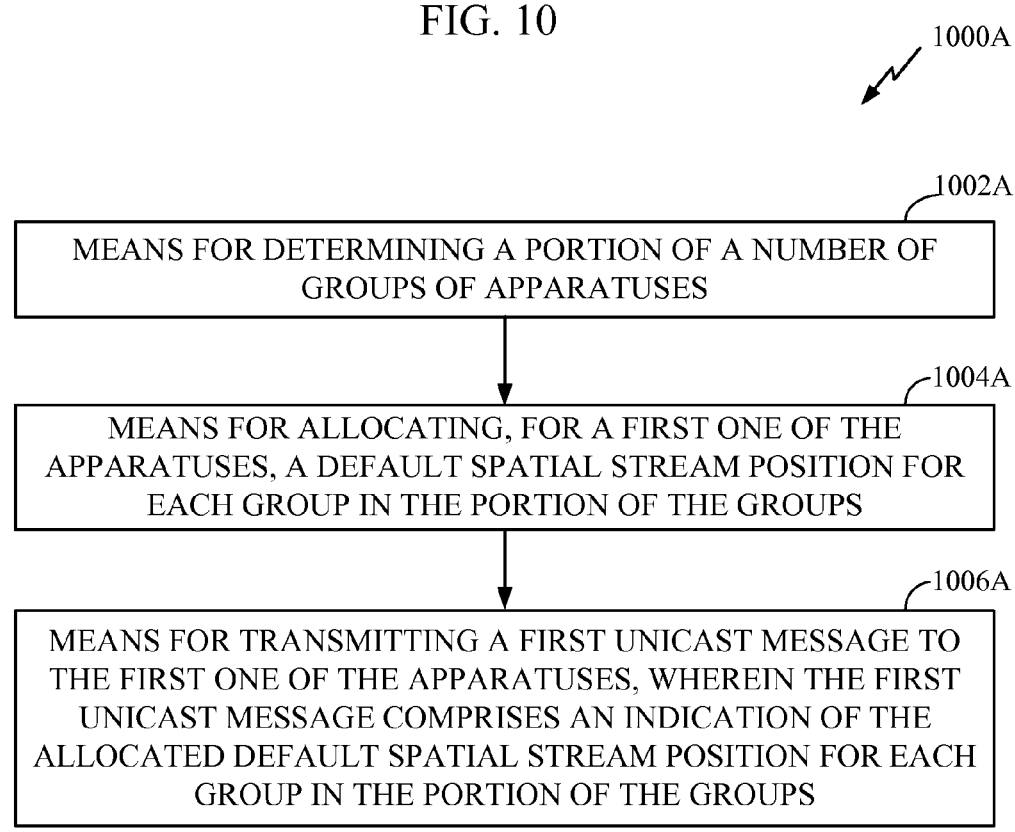
FIG. 10A illustrates example means for performing the operations shown in FIG. 10.

FIG. 10 illustrates example operations 1000 that may be performed at an AP to efficiently manage groups of apparatuses using default spatial stream positions for a portion of the groups. The groups of apparatuses may receive simultaneously transmitted spatial streams, such as simultaneous downlink transmissions in a DL MU-MIMO scheme.

The operations 1000 may begin, at 1002, by determining a portion of a number of groups of apparatuses. The number of the groups of apparatuses may be determined based on the number of bits in a group ID. For example, a 6-bit group ID may have 64 groups of apparatuses. The portion of the number of groups may be a subset of the number of groups. For example, the portion may comprise 32 groups out of 64 possible groups.

For a first one of the apparatuses at 1004, a default spatial stream position may be allocated for each group in the portion of the groups. This allocation may occur during association of a the first one of the apparatuses (e.g., a user terminal).

At 1006, a first unicast message may be transmitted to the first one of the apparatuses, wherein the first unicast message comprises an indication of the allocated default spatial stream position for each group in the portion of the groups. This unicast message may be transmitted during association of the first one of the apparatuses.

At association, every user terminal (or STA) may be allocated a default spatial stream position for a subset of the number of groups (e.g., 32 groups out of 64). For example, FIG. 11 illustrates example contents 1100 of a unicast message transmitted from an AP to a particular user terminal with a default spatial stream position for the user terminal in each of 32 groups. The subset of the number of groups that will be assigned default spatial stream positions may be determined by the AP. The contents 1100 are conceptually illustrated with rows of group numbers 1102 and columns of STA spatial stream positions 1104. Symbol x at row i, column j means that the STA is allocated position j for group number i. As described above, two bits may be used to indicate STA position (1,2,3 or 4) per group in the unicast message, and six bits, for example, may be used to indicate the group number (i.e., group ID).

Default spatial stream positions allocated during association may be considered as pre-provisions for supporting a large number of STAs without further messaging. For example, 96% of the STA combinations in a BSS with 100 STAs may be supported if default positions for 32 groups are allocated for each STA.

Allocating default spatial stream positions during association may also avoid the disadvantage of designing for the current network size, and then expanding later. In other words, this solution avoids having to send additional messages to the existing members every time a new STA is admitted to the BSS, thereby increasing group ID management efficiency.

For example, consider a BSS with 10 STAs and assume all the $^{10}C_4$ (10 choose 4, or the number of STA combinations having a size of 4 spatial stream positions in 10 STAs) STA combinations are supported with the current group assignments. When an eleventh STA joins the BSS, an additional $^{10}C_3$=120 STA combinations may most likely need to be supported. A scheme which expands with network size would likely require messages to each of the existing 10 members as well as the new STA. Each existing STA would most likely need to be sent information for $^9C_2$ new STA combinations.

Aspects of the present disclosure with pre-provisioned default spatial stream positions, however, need not transmit any messages to the existing members of the BSS to update the STA combinations. Rather, only a single unicast message may be sent to the eleventh STA, typically during association, to inform the eleventh STA of which groups this new STA is a member.

Figure 12:
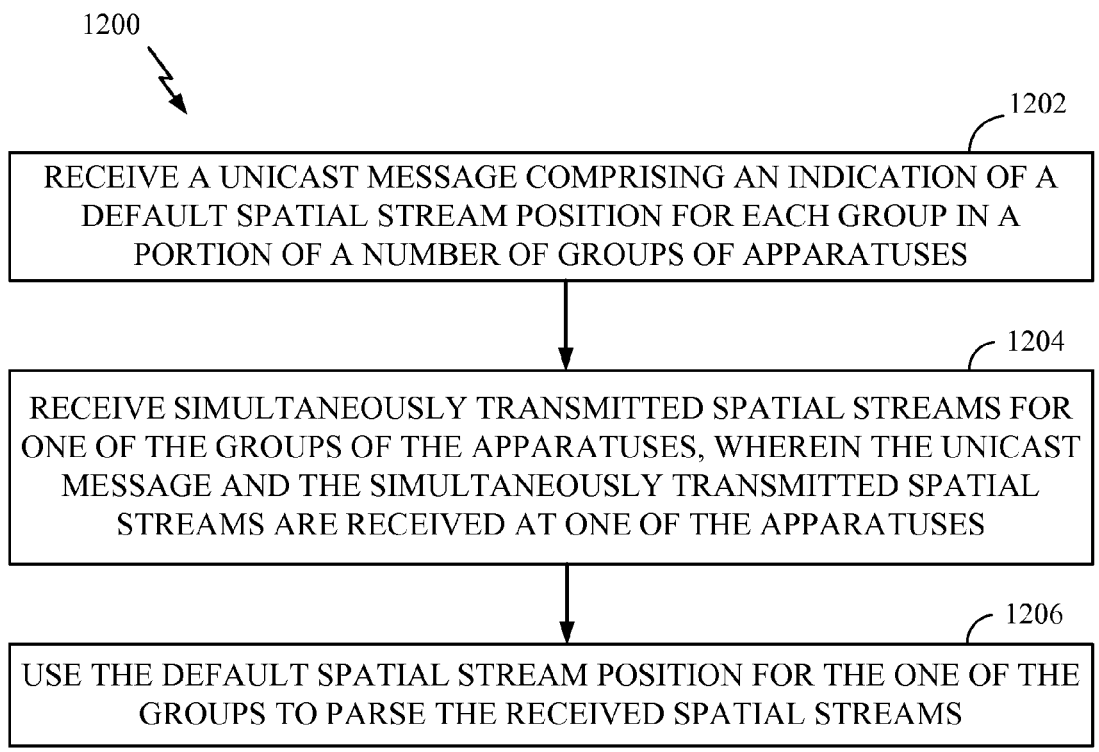
FIG. 12 illustrates example operations that may be performed at a user terminal to parse received simultaneously transmitted spatial streams using default spatial stream positions for a portion of a group of apparatuses, in accordance with certain aspects of the present disclosure.
Figure 12A:
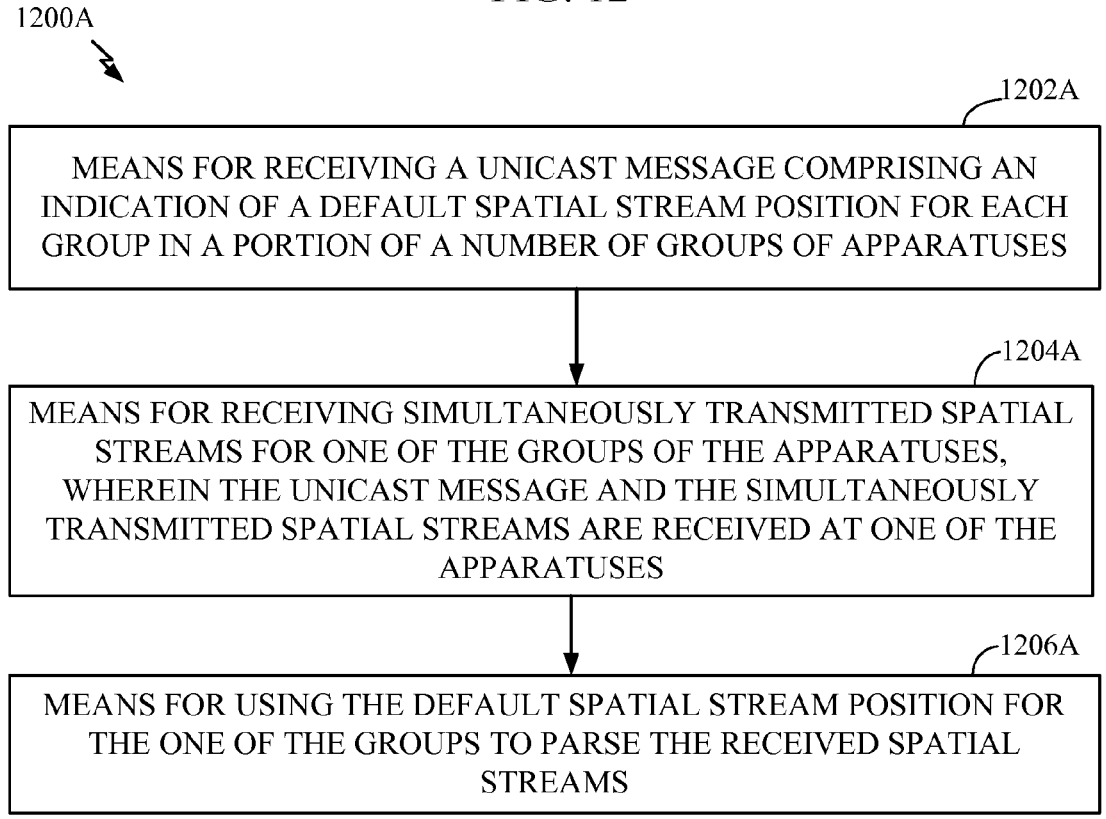
FIG. 12A illustrates example means for performing the operations shown in FIG. 12.

FIG. 12 illustrates example operations 1200 to parse received simultaneously transmitted spatial streams using default spatial stream positions for a portion of a group of apparatuses. The operations 1200 may be performed by a user terminal, for example.

The operations 1200 may begin, at 1202, by receiving a unicast message comprising an indication of a default spatial stream position for each group in a portion of a number of groups of apparatuses. At 1204, simultaneously transmitted spatial streams for one of the groups of the apparatuses may be received, wherein the unicast message and the simultaneously transmitted spatial streams are received at one of the apparatuses. At 1206, the default spatial stream position for the one of the groups may be used to parse the received simultaneously transmitted spatial streams.

Power Savings for STAs

As another or additional group ID management scheme, there may be a power savings scheme for the user terminals. Opportunities for power savings may arise under many conditions, such as when a small subset of the user terminals is receiving most of the traffic in a large network. The association time messaging described above may not be enough to provide power savings because every user terminal has to listen to all transmissions.

Figure 13:
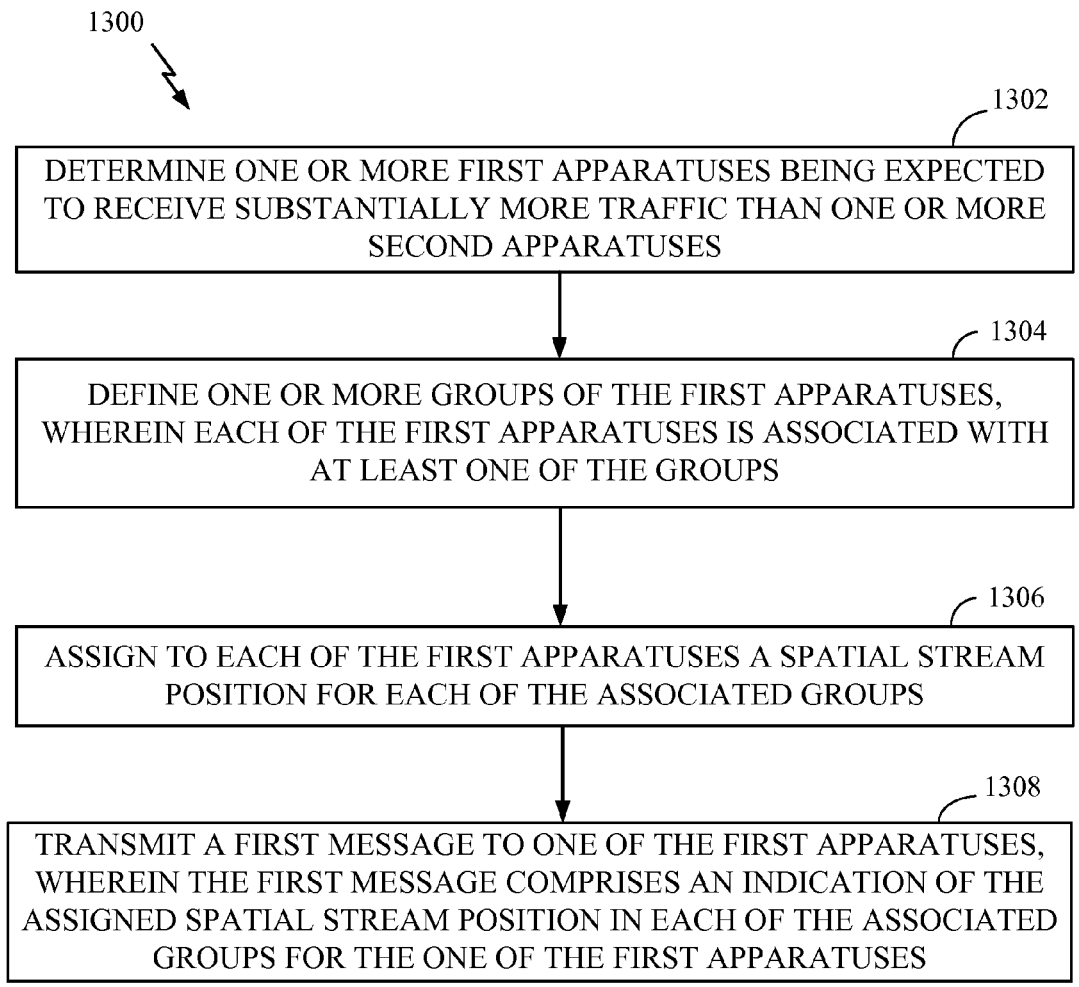
FIG. 13 illustrates example operations that may be performed at an AP to efficiently manage groups of apparatuses receiving simultaneously transmitted spatial streams, based on amounts of traffic the apparatuses are expected to receive, in accordance with certain aspects of the present disclosure.
Figure 13A:
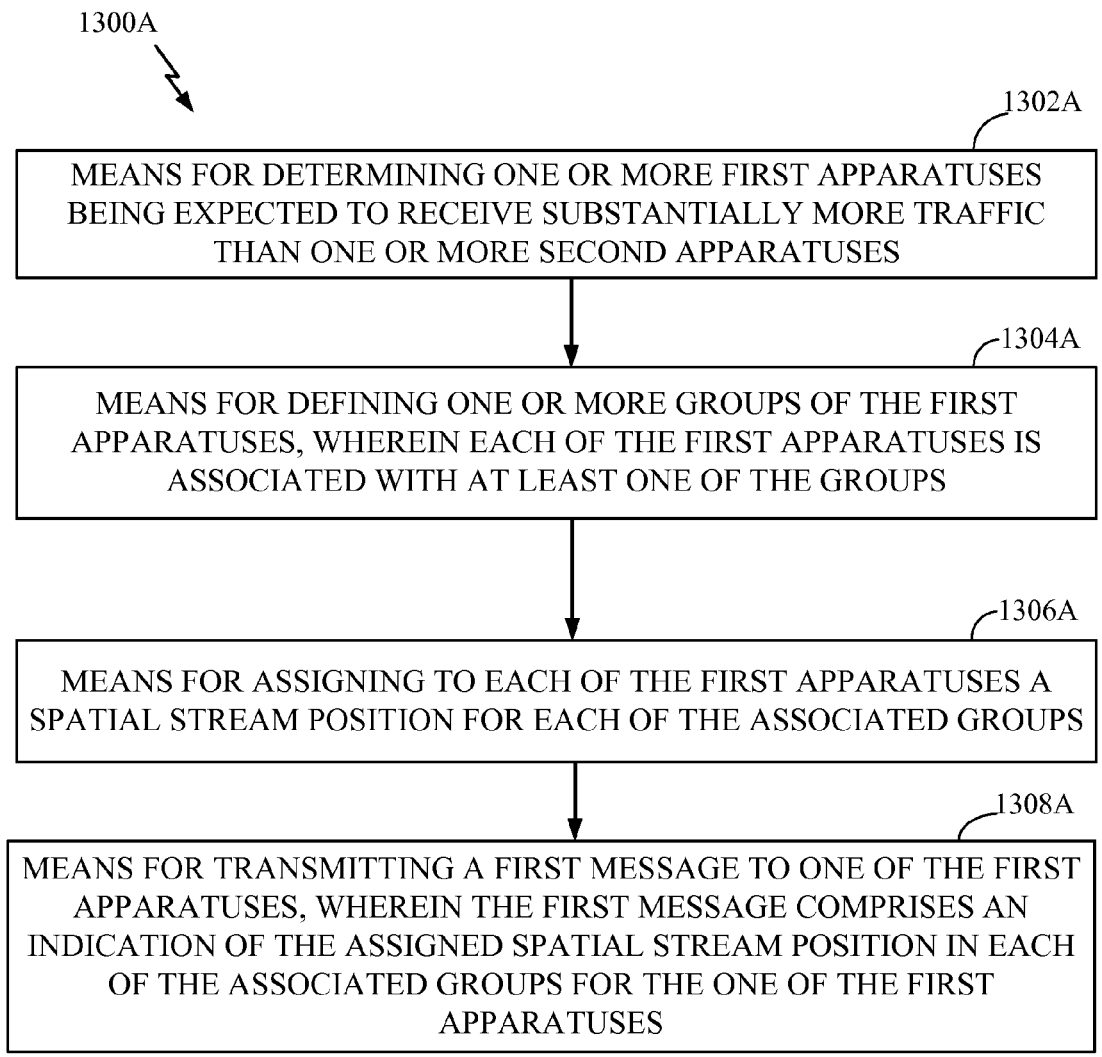
FIG. 13A illustrates example means for performing the operations shown in FIG. 13.

To solve this problem, FIG. 13 illustrates example operations 1300 to efficiently manage groups of apparatuses receiving simultaneously transmitted spatial streams, based on amounts of traffic being sent to the apparatuses. The operations 1300 may be performed at an AP, for example.

For certain aspects, the operations 1300 may begin, at 1302, by determining one or more first apparatuses being expected to receive (i.e., being sent) substantially more traffic than one or more second apparatuses. For example, the one or more first apparatuses may be being sent most of the traffic. This determination may be made based on a threshold amount of traffic, wherein the one or more first apparatuses are being expected to receive more than the threshold amount.

At 1304, one or more groups of the first apparatuses may be defined, wherein each of the first apparatuses is associated with at least one of the groups. These groups may be considered as power-save groups. At 1306, each of the first apparatuses may be assigned a spatial stream position for each of the associated groups. A first message may be transmitted at 1308 to one of the first apparatuses, wherein the first message comprises an indication of the assigned spatial stream position in each of the associated groups for the one of the first apparatuses. The first message may comprise a unicast message or a multicast message. For certain aspects, multiple unicast messages may be transmitted, one unicast message to each of the first apparatuses, while in other aspects, one multicast message may be transmitted to all, or at least some, of the first apparatuses.

A unicast message may be transmitted to each of the relevant user terminals with the assigned spatial stream position in each of the power-save groups for a particular one of the relevant user terminals. For example, FIG. 14 illustrates example contents 1400 of a unicast message transmitted from an AP to a particular user terminal (or STA) with a spatial stream position for the user terminal in each of three power-save groups. The contents 1400 are conceptually illustrated with rows of power-save group numbers 1402 and columns of STA spatial stream positions 1104. Symbol x at row i, column j means that the STA is allocated position j for power-save group number i. As described above, two bits may be used to indicate STA position (1, 2, 3, or 4) per power-save group in the unicast message, and six bits, for example, may be used to indicate the power-save group number (i.e., power-save group ID).

For certain aspects, the power-save groups may be formed of relevant user terminals (e.g., those receiving most of the traffic) using group IDs which are not used for the default spatial stream positions described above. For example, with a 6-bit group ID, there may be 64 different groups. If the first 32 groups (having group IDs ranging from 0 to 31) are used for default spatial stream positions, then any one or more of the remaining 32 groups (having group IDs ranging from 32 to 63) may be used to define any power-save groups. In the example of FIG. 14, the first 32 groups are used for default spatial stream positions, and therefore, group IDs 35, 50, and 63 may be used for the power save groups.

As an example power savings operation, consider a BSS with 100 STAs and assume that 5 of the STAs are receiving most of the traffic. In this case, $^5C_4$ power-save groups may be formed to support the 5 STAs. Unicast messages may be transmitted only to each of the 5 STAs, wherein each unicast message comprises the power-save groups relevant to a particular STA intended to receive the message. Messages are not sent to the remaining 95 STAs informing these STAs of the power-save groups. For certain aspects, even though 5 STAs are receiving most of the traffic, less than the 5 STAs may be associated with one or more power-save groups.

During subsequent MU-MIMO transmissions to a power-save group, only the STAs that are members of the particular power-save group listen to the transmissions. The remaining 95 STAs ignore the transmissions, as do ones of the 5 STAs who are not members of the particular power-save group.

Once a power-save group has been created, this group may be purged in an effort to free up a group ID. To purge a power-save group, the AP may send a unicast message to relevant user terminals (i.e., user terminals who were associated with the particular power-save group), informing them that a power-save group is being dissolved. This purging process may handle scenarios where this group of user terminals are no longer being sent enough traffic (e.g., not substantially more traffic than other user terminals outside the power-save group). Once a power-save group has been purged, the group ID may be freed up for new associations.

Unicast Group ID Assignment

A group ID assignment should most likely be acknowledged before that particular group ID can be used. Currently, there is no acknowledgment scheme available for broadcast messages. Furthermore, managing multiuser (MU) group membership on a per-STA basis generally seems like a cleaner design. For example, most events in the network will happen independently across STAs.

Figure 15:
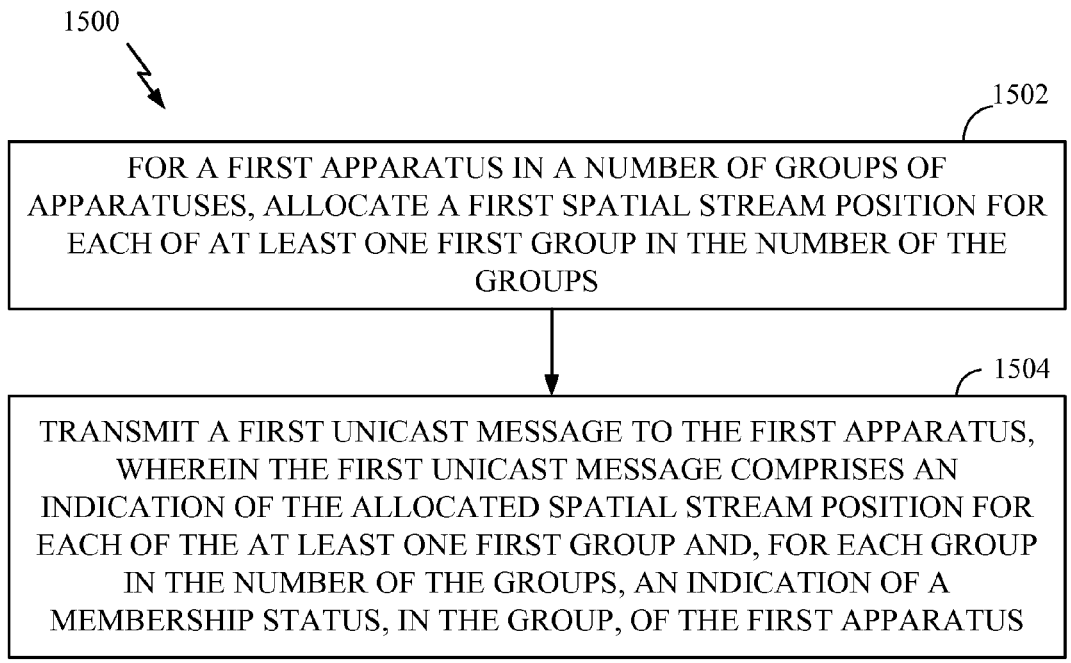
FIG. 15 illustrates example operations that may be performed at an AP to efficiently manage groups of apparatuses receiving simultaneously transmitted spatial streams using, for at least one of the apparatuses, a membership status and a spatial stream position for each of the groups, in accordance with certain aspects of the present disclosure.
Figure 15A:
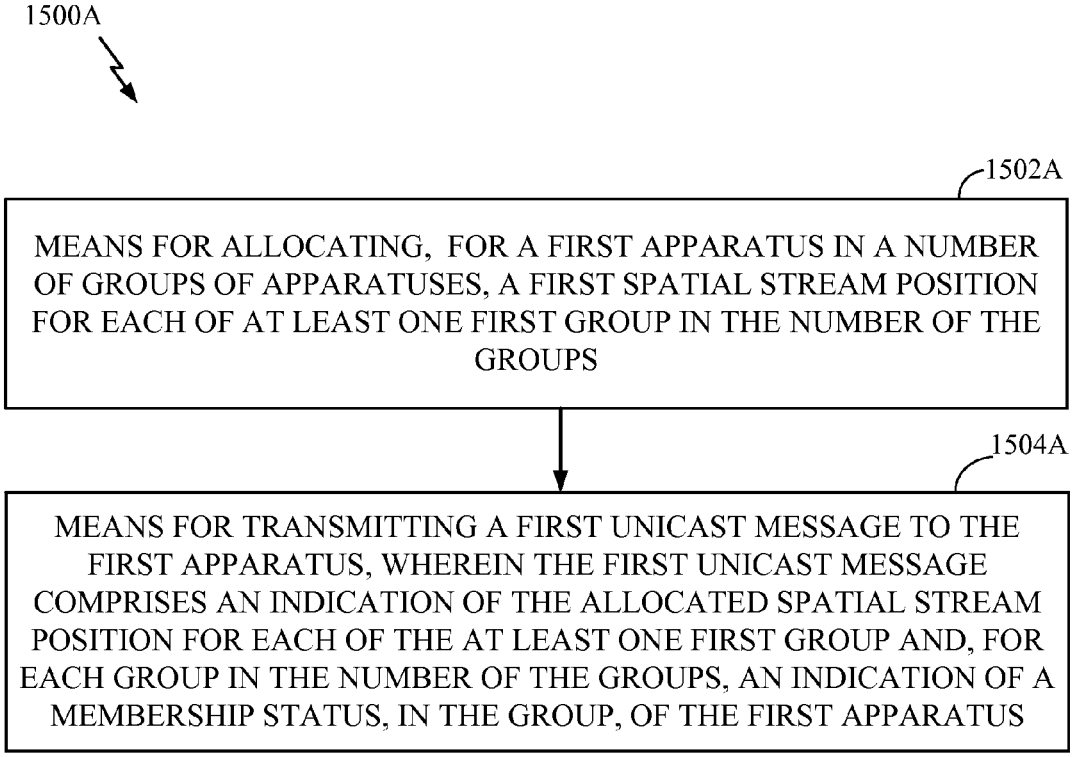
FIG. 15A illustrates example means capable of performing the operations shown in FIG. 15.

FIG. 15 illustrates example operations 1500 that may be performed at an AP to efficiently manage groups of apparatuses using, for at least one of the apparatuses, a membership status and a spatial stream position for each of the groups. The groups of apparatuses may receive simultaneously transmitted spatial streams, such as simultaneous downlink transmissions in a DL MU-MIMO scheme.

The operations 1500 may begin, at 1502, by allocating, for a first apparatus in a number of groups of apparatuses, a first spatial stream position for each of at least one first group in the number of the groups. This allocation may occur during association of the first one of the apparatuses (e.g., a user terminal).

At 1504, a first unicast message may be transmitted to the first apparatus, wherein the first unicast message comprises an indication of the allocated spatial stream position for each of the at least one first group and, for each group in the number of the groups, an indication of a membership status, in the group, of the first apparatus. This unicast message may be transmitted during association of the first one of the apparatuses.

Figure 16:
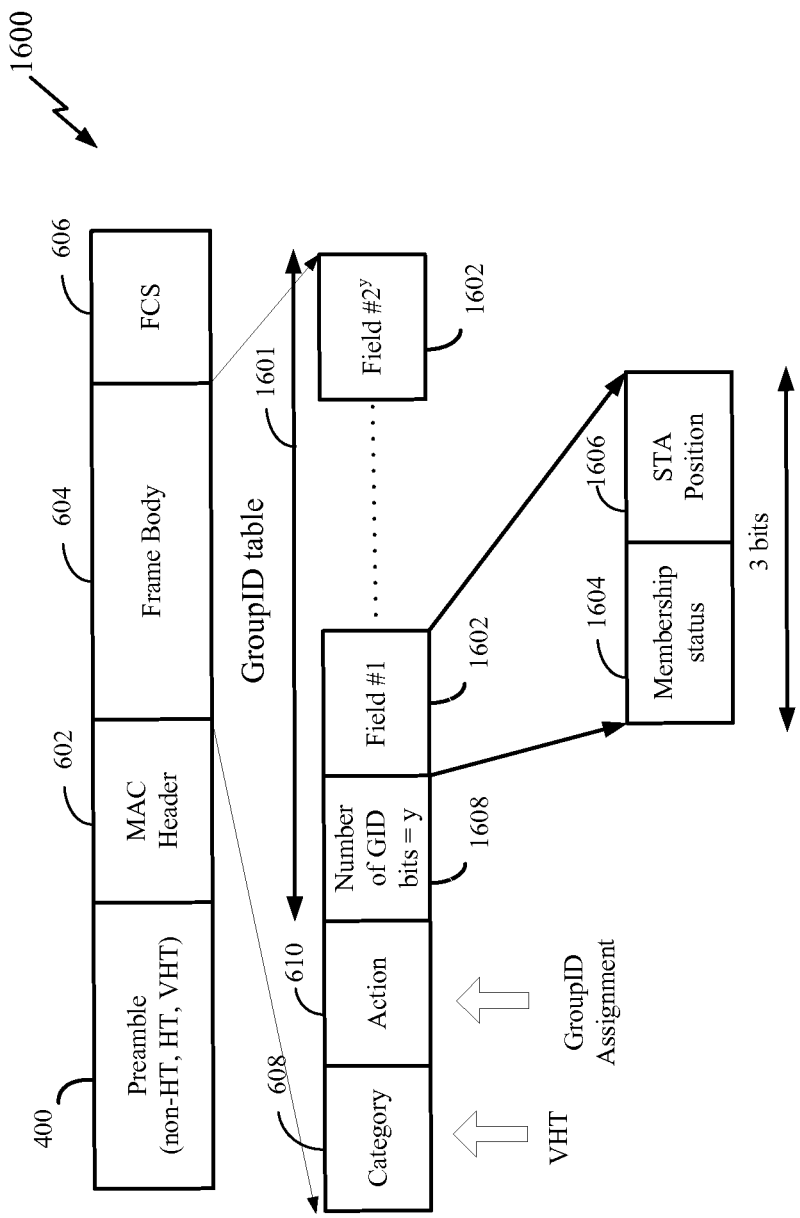
FIG. 16 illustrates an example unicast group ID assignment frame transmitted from an AP to a particular user terminal with a membership status and a spatial stream position for each group, in accordance with certain aspects of the present disclosure.

FIG. 16 illustrates an example unicast group ID assignment frame 1600 transmitted from an AP to a particular user terminal. This unicast message may be transmitted during association with the user terminal or any time the group assignment of the user terminal is updated. The frame body 604 may comprise a group ID table 1601, wherein the group ID table comprises a number of group ID fields 1602 for group ID management. Each group ID field 1602 may be associated with a certain group, and the group ID fields 1602 may be ordered in the frame body 604 according to the group number (e.g., the group ID).

Each group ID field 1602 may indicate a membership status 1604 for the particular user terminal in the group associated with the field 1602. The membership status 1604 may comprise a single bit. For certain aspects, a value of "1" for the membership status 1604 in a given group ID field 1602 may indicate that the particular user terminal is a member of the group associated with the given group ID field 1602, whereas a value of "0" may indicate that the particular user terminal is not a member of this group. Each group ID field 1602 may also comprise an indication of a spatial stream position (e.g., a STA position 1606). As described above, two bits may be used to indicate the STA position (00, 01, 10, or 11) per group ID field 1602 in the unicast group ID assignment frame 1600.

For certain aspects, the group ID assignment frame 1600 may comprise a field 1608 indicating a number y of group ID bits. The number of group ID bits indicated by the field 1608 may provide the particular user terminal receiving the frame 1600 with the number of fields 1602 in the group ID table 1601. For example, if y group ID bits are indicated by the field 1608, then the group ID assignment frame 1600 may include $2^y$ group ID fields.

Thus, this field 1608 provides flexibility, such that the group ID assignment frame 1600 need not include group ID fields 1602 for all possible groups according to the group ID field 416. For example, an AP for a small network may use shorter unicast group ID assignment messages when the AP operates with less than 64 groups. This scenario may be appropriate in a home environment, where just a few groups may be sufficient. Furthermore, the flexibility offered by including the field 1608 may provide for any future increases in the size of the group ID (i.e., greater than 6 bits).

For certain aspects, the unicast group ID assignment frame 1600 may be encrypted before transmission. Such encryption may prevent rogue group ID assignments.

Figure 17:
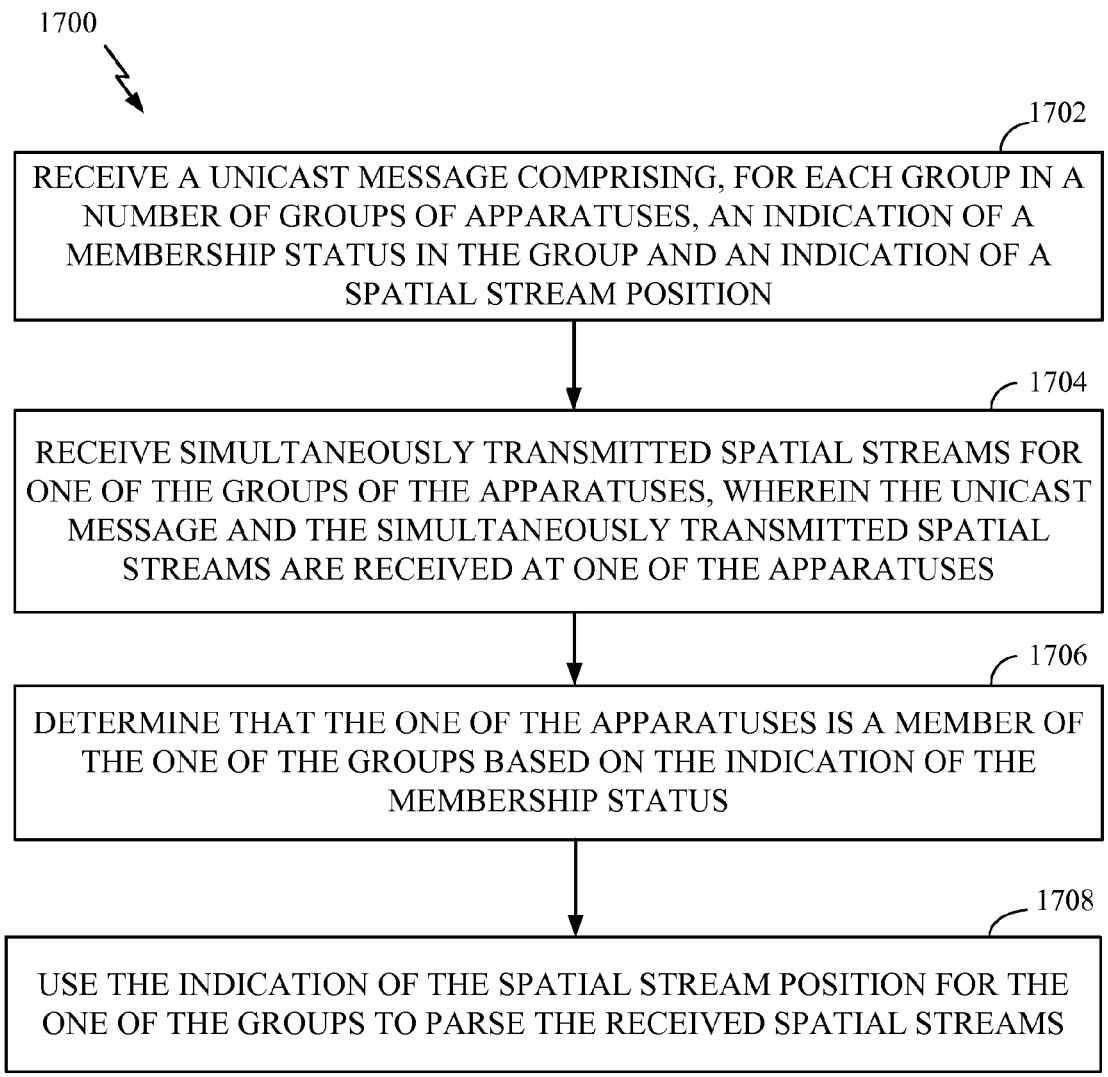
FIG. 17 illustrates example operations that may be performed at a user terminal to parse received simultaneously transmitted spatial streams using spatial stream positions for a group of apparatuses, in accordance with certain aspects of the present disclosure.
Figure 17A:
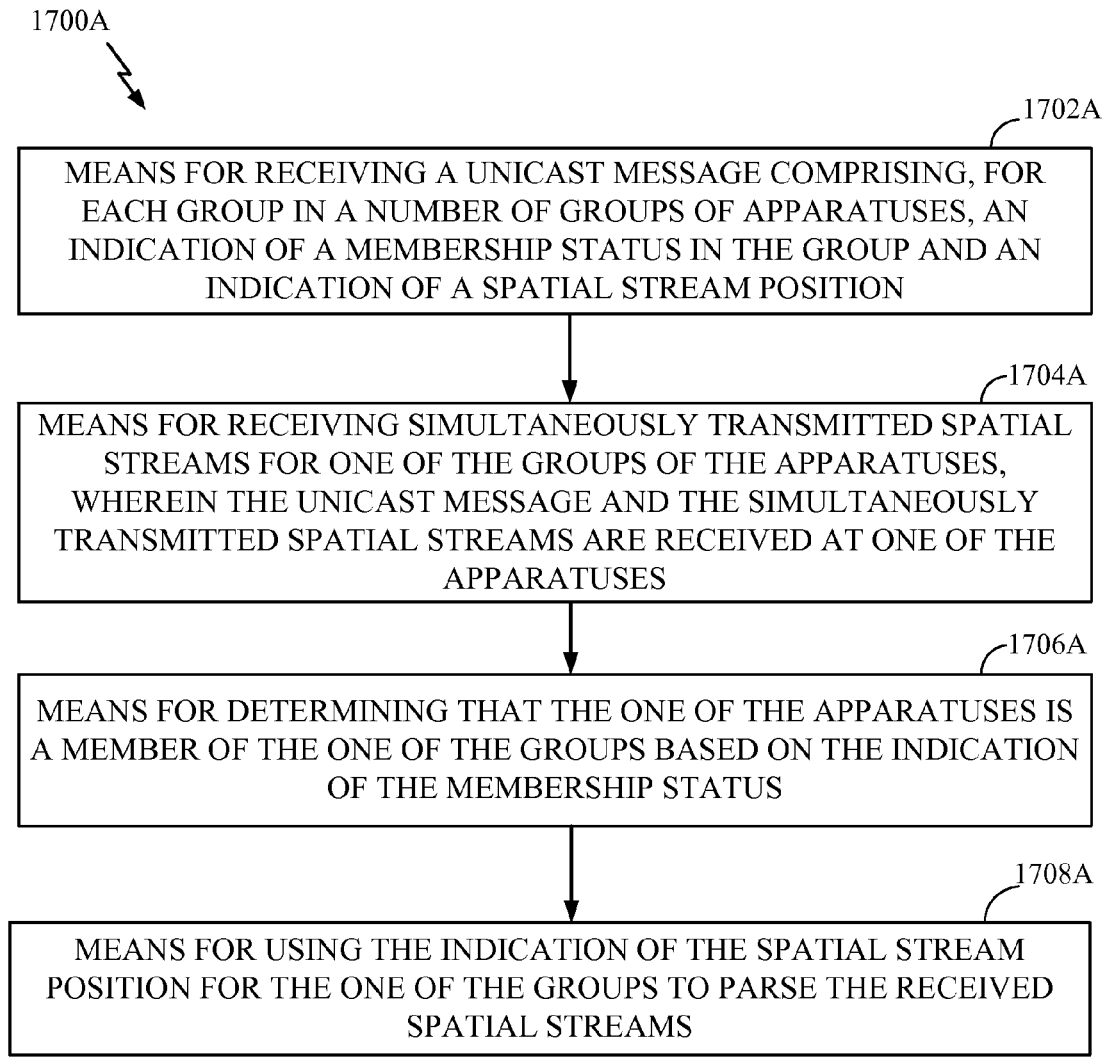
FIG. 17A illustrates example means capable of performing the operations shown in FIG. 17.

FIG. 17 illustrates example operations 1700 to parse received simultaneously transmitted spatial streams using spatial stream positions for a group of apparatuses. The operations 1700 may be performed by a user terminal, for example.

The operations 1700 may begin, at 1702, by receiving a unicast message comprising, for each group in a number of groups, an indication of a membership status in the group and an indication of a spatial stream position. At 1704, simultaneously transmitted spatial streams for one of the groups of the apparatuses may be received, wherein the unicast message and the simultaneously transmitted spatial streams are received at one of the apparatuses (e.g., at the user terminal). At 1706, the one of the apparatuses may be determined is a member of the one of the groups based on the indication of the membership status. At 1708, the indication of the spatial stream position for the one of the groups may be used to parse the received simultaneously transmitted spatial streams.

Figure 5A:
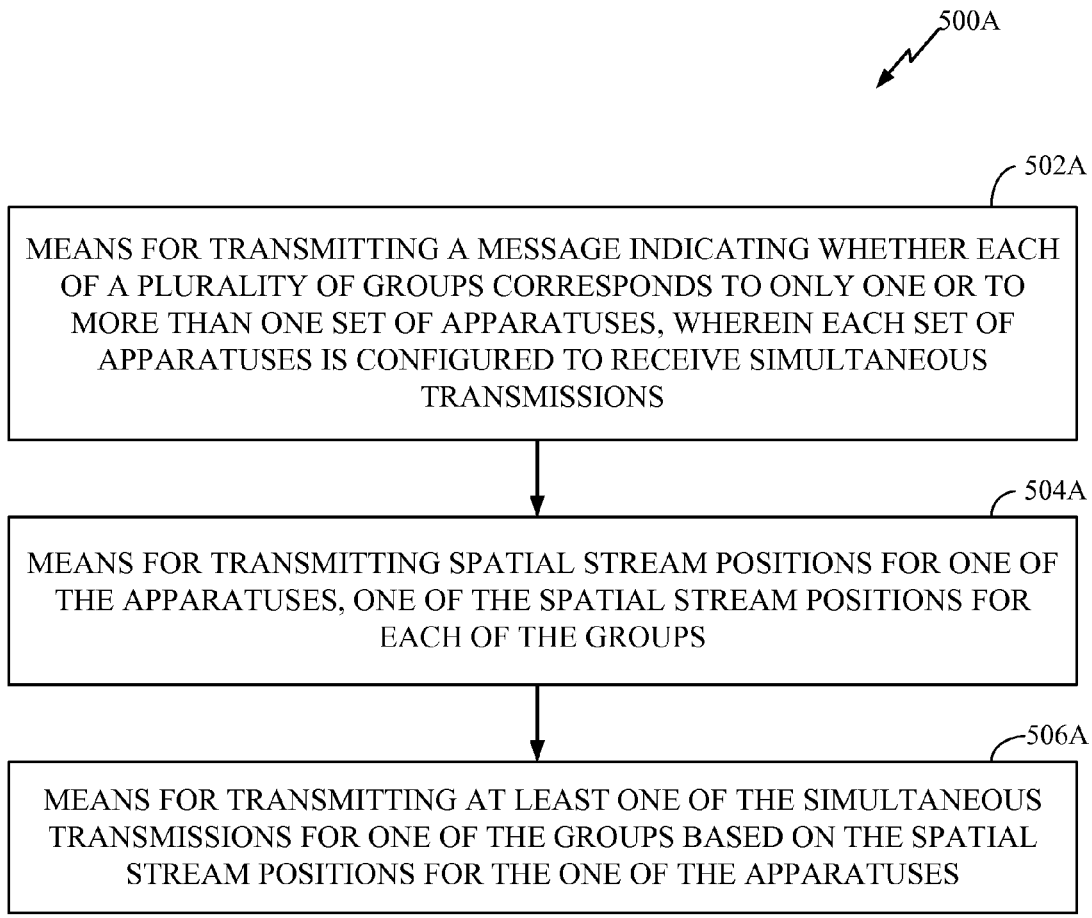
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A.

For example, means for transmitting may comprise a transmitter (e.g., the transmitter unit 222) and/or an antenna 224 of the access point 110 illustrated in FIG. 2. Means for receiving may comprise a receiver (e.g., the receiver unit 254) and/or an antenna 252 of the user terminal 120 illustrated in FIG. 2. Means for processing, means for determining, or means for using may comprise a processing system, which may include one or more processors, such as the RX data processor 270, the TX data processor 288, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface (in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
   transmitting a message indicating whether each of a plurality of groups corresponds to only one or to more than one set of apparatuses, wherein each set of apparatuses is configured to receive simultaneous transmissions;
   transmitting spatial stream positions for one of the apparatuses of the only one or more than one set, wherein one of the spatial stream positions is associated with each of the groups of apparatuses; and
   transmitting at least one of the simultaneous transmissions for one of the groups of apparatuses based on the spatial stream positions for the one of the apparatuses of the only one or more than one set.

2. The method of claim 1, wherein the message comprises a beacon frame for a wireless local area network (WLAN).

3. The method of claim 1, wherein transmitting the spatial stream positions comprises transmitting a group identifier indicating the one of the groups and the spatial stream positions, wherein the group identifier comprises y bits, and wherein the message comprises a bitmap having $2^y$ bits with one bit for each of the plurality of groups.

4. The method of claim 3, wherein the bitmap has a value of 1 for each of the plurality of groups corresponding to more than one set of apparatuses and the bitmap has a value of 0 for each of the plurality of groups corresponding to only one set of apparatuses.

5. The method of claim 4, wherein the bitmap has a value of 0 for each of the plurality of groups that are not used.

6. The method of claim 1, wherein transmitting the spatial stream positions comprises transmitting a group identifier indicating the one of the groups and the spatial stream positions and wherein the message indicates that the one of the groups indicated by the group identifier has changed from corresponding to only one set of apparatuses to corresponding to more than one set of apparatuses.

7. The method of claim 1, wherein transmitting the spatial stream positions comprises transmitting a frame comprising a group identifier indicating the one of the groups and the spatial stream positions for the one of the apparatuses.

8. The method of claim 7, wherein transmitting the frame comprises transmitting the frame during association with the one of the apparatuses.

9. The method of claim 7, wherein transmitting the frame comprises transmitting the frame in response to the one of the groups indicated by the group identifier changing from corresponding to more than one set of apparatuses to corresponding to only one set of apparatuses.

10. The method of claim 7, wherein the frame comprises a portion for members of the plurality of groups corresponding to only one set of apparatuses and including the one of the apparatuses in the only one set, the portion comprising group information for each of the members and the group information comprising:
    a group identification (ID) value indicating one of the members; and
    a spatial stream position for the one of the apparatuses, the spatial stream position corresponding to the group ID value.

11. The method of claim 10, wherein the frame comprises a field indicating a number of the members in the portion of the frame.

12. The method of claim 7, wherein the frame comprises a field indicating a number of the groups corresponding to more than one set of apparatuses.

13. An apparatus for wireless communications, comprising:
    a transmitter configured to:
       transmit a message indicating whether each of a plurality of groups corresponds to only one or to more than one set of apparatuses, wherein each set of apparatuses is configured to receive simultaneous transmissions;
       transmit spatial stream positions for one of the apparatuses of the only one or more than one set, wherein one of the spatial stream positions is associated with each of the groups of apparatuses; and
       transmit at least one of the simultaneous transmissions for one of the groups of apparatuses based on the spatial stream positions for the one of the apparatuses of the only one or more than one set.

14. The apparatus of claim 13, wherein the message comprises a beacon frame for a wireless local area network (WLAN).

15. The apparatus of claim 13, wherein the transmitter is configured to transmit a group identifier indicating the one of the groups and the spatial stream positions, wherein the group identifier comprises y bits, and wherein the message comprises a bitmap having $2^y$ bits with one bit for each of the plurality of groups.

16. The apparatus of claim 15, wherein the bitmap has a value of 1 for each of the plurality of groups corresponding to more than one set of apparatuses and the bitmap has a value of 0 for each of the plurality of groups corresponding to only one set of apparatuses.

17. The apparatus of claim 16, wherein the bitmap has a value of 0 for each of the plurality of groups that are not used.

18. The apparatus of claim 13, wherein the transmitter is configured to transmit a group identifier indicating the one of the groups and the spatial stream positions and wherein the message indicates that the one of the groups indicated by the group identifier has changed from corresponding to only one set of apparatuses to corresponding to more than one set of apparatuses.

19. The apparatus of claim 13, wherein the transmitter is configured to transmit a frame comprising:
    a group identifier indicating the one of the groups; and
    the spatial stream positions for the one of the apparatuses.

20. The apparatus of claim 19, wherein the transmitter is configured to transmit the frame during association with the one of the apparatuses.

21. The apparatus of claim 19, wherein the transmitter is configured to transmit the frame in response to the one of the groups indicated by the group identifier changing from corresponding to more than one set of apparatuses to corresponding to only one set of apparatuses.

22. The apparatus of claim 19, wherein the frame comprises a portion for members of the plurality of groups corresponding to only one set of apparatuses and including the one of the apparatuses in the only one set, the portion comprising group information for each of the members and the group information comprising:
    a group identification (ID) value; and
    a spatial stream position for the one of the apparatuses, the spatial stream position corresponding to the group ID value.

23. The apparatus of claim 22, wherein the frame comprises a field indicating a number of the members in the portion of the frame.

24. The apparatus of claim 19, wherein the frame comprises a field indicating a number of the groups corresponding to more than one set of apparatuses.

25. An apparatus for wireless communications, comprising:

means for transmitting a message indicating whether each of a plurality of groups corresponds to only one or to more than one set of apparatuses, wherein each set of apparatuses is configured to receive simultaneous transmissions;

means for transmitting spatial stream positions for one of the apparatuses of the only one or more than one set, wherein one of the spatial stream positions is associated with each of the groups of apparatuses; and means for transmitting at least one of the simultaneous transmissions for one of the groups of apparatuses based on the spatial stream positions for the one of the apparatuses of the only one or more than one set.

26. The apparatus of claim 25, wherein the message comprises a beacon frame for a wireless local area network (WLAN).

27. The apparatus of claim 25, wherein the means for transmitting the spatial stream positions is configured to transmit a group identifier indicating the one of the groups and the spatial stream positions, wherein the group identifier comprises y bits, and wherein the message comprises a bitmap having $2^y$ bits with one bit for each of the plurality of groups.

28. The apparatus of claim 27, wherein the bitmap has a value of 1 for each of the plurality of groups corresponding to more than one set of apparatuses and the bitmap has a value of 0 for each of the plurality of groups corresponding to only one set of apparatuses.

29. The apparatus of claim 28, wherein the bitmap has a value of 0 for each of the plurality of groups that are not used.

30. The apparatus of claim 25, wherein the means for transmitting the spatial stream positions is configured to transmit a group identifier indicating the one of the groups and the spatial stream positions and wherein the message indicates that the one of the groups indicated by the group identifier has changed from corresponding to only one set of apparatuses to corresponding to more than one set of apparatuses.

31. The apparatus of claim 25, wherein the means for transmitting the spatial stream positions is configured to transmit a frame comprising a group identifier indicating the one of the groups and the spatial stream positions for the one of the apparatuses.

32. The apparatus of claim 31, wherein the means for transmitting the frame is configured to transmit the frame during association with the one of the apparatuses.

33. The apparatus of claim 31, wherein the means for transmitting the frame is configured to transmit the frame in response to the one of the groups indicated by the group identifier changing from corresponding to more than one set of apparatuses to corresponding to only one set of apparatuses.

34. The apparatus of claim 31, wherein the frame comprises a portion for members of the plurality of groups corresponding to only one set of apparatuses and including the one of the apparatuses in the only one set, the portion comprising group information for each of the members and the group information comprising:
a group identification (ID) value indicating one of the members; and
a spatial stream position for the one of the apparatuses, the spatial stream position corresponding to the group ID value.

35. The apparatus of claim 34, wherein the frame comprises a field indicating a number of the members in the portion of the frame.

36. The apparatus of claim 31, wherein the frame comprises a field indicating a number of the groups corresponding to more than one set of apparatuses.

37. A computer-program product for wireless communications, comprising a non-transitory computer-readable medium comprising instructions executable to:
transmit a message indicating whether each of a plurality of groups corresponds to only one or to more than one set of apparatuses, wherein each set of apparatuses is configured to receive simultaneous transmissions;
transmit spatial stream positions for one of the apparatuses of the only one or more than one set, wherein one of the spatial stream positions is associated with each of the groups of apparatuses; and
transmit at least one of the simultaneous transmissions for one of the groups of apparatuses based on the spatial stream positions for the one of the apparatuses of the only one or more than one set.

38. An access point for wireless communication, comprising:
at least one antenna; and
a transmitter configured to:
transmit, via the at least one antenna, a message indicating whether each of a plurality of groups corresponds to only one or to more than one set of apparatuses, wherein each set of apparatuses is configured to receive simultaneous transmissions;
transmit, via the at least one antenna, spatial stream positions for one of the apparatuses of the only one or more than one set, wherein one of the spatial stream positions is associated with each of the groups of apparatuses; and
transmit, via the at least one antenna, at least one of the simultaneous transmissions for one of the groups of apparatuses based on the spatial stream positions for the one of the apparatuses of the only one or more than one set.

39. A method for wireless communications, comprising:
receiving, at an apparatus, a message indicating whether a group corresponds to only one or to more than one set of apparatuses, wherein each set of apparatuses is configured to receive simultaneous transmissions;
receiving, at the apparatus, a group identifier and a spatial stream position for the apparatus in the group indicated by the group identifier; and
using the spatial stream position to parse the received simultaneous transmissions.

40. The method of claim 39, wherein the message comprises a beacon frame for a wireless local area network (WLAN).

41. The method of claim 39, wherein the group identifier comprises y bits and the message comprises a bitmap having $2^y$ bits with one bit for each of a plurality of groups corresponding to only one or to more than one set of apparatuses.

42. The method of claim 41, wherein the bitmap has a value of 1 for each of the plurality of groups corresponding to more than one set of apparatuses and the bitmap has a value of 0 for each of the plurality of groups corresponding to only one set of apparatuses.

43. The method of claim 42, wherein the bitmap has a value of 0 for each of the plurality of groups that are not used.

44. The method of claim 39, wherein the message indicates that the group indicated by the group identifier has changed from corresponding to only one set of apparatuses to corresponding to more than one set of apparatuses.

45. The method of claim 39, wherein receiving the group identifier and the spatial stream position comprises receiving a frame comprising the group identifier and spatial stream positions for the apparatus, one spatial stream position in each of a plurality of groups including the group indicated by the group identifier.

46. The method of claim 45, wherein receiving the frame comprises receiving the frame during association with the apparatus.

47. The method of claim 45, wherein receiving the frame comprises receiving the frame in response to the group indicated by the group identifier changing from corresponding to more than one set of apparatuses to corresponding to only one set of apparatuses.

48. The method of claim 45, wherein the frame comprises a portion for members of the plurality of groups corresponding to only one set of apparatuses and including the apparatus in the only one set, the portion comprising group information for each of the members and the group information comprising:
   a group identification (ID) value; and
   a spatial stream position for the apparatus, the spatial stream position corresponding to the group ID value.

49. The method of claim 48, wherein the frame comprises a field indicating a number of the members in the portion of the frame.

50. The method of claim 45, wherein the frame comprises a field indicating a number of the groups corresponding to more than one set of apparatuses.

51. An apparatus for wireless communications, comprising:
   a receiver configured to:
      receive a message indicating whether a group corresponds to only one or to more than one set of apparatuses, wherein set of apparatuses is configured to receive simultaneous transmissions; and
      receive a group identifier and a spatial stream position for the apparatus in the group indicated by the group identifier; and
   a processing system configured to use the spatial stream position to parse the received simultaneous transmissions.

52. The apparatus of claim 51, wherein the message comprises a beacon frame for a wireless local area network (WLAN).

53. The apparatus of claim 51, wherein the group identifier comprises y bits and the message comprises a bitmap having $2^y$ bits with one bit for each of a plurality of groups corresponding to only one or to more than one set of apparatuses.

54. The apparatus of claim 53, wherein the bitmap has a value of 1 for each of the plurality of groups corresponding to more than one set of apparatuses and the bitmap has a value of 0 for each of the plurality of groups corresponding to only one set of apparatuses.

55. The apparatus of claim 54, wherein the bitmap has a value of 0 for each of the plurality of groups that are not used.

56. The apparatus of claim 51, wherein the message indicates that the group indicated by the group identifier has changed from corresponding to only one set of apparatuses to corresponding to more than one set of apparatuses.

57. The apparatus of claim 51, wherein the receiver is configured to receive a frame comprising the group identifier and spatial stream positions for the apparatus, one spatial stream position in each of a plurality of groups including the group indicated by the group identifier.

58. The apparatus of claim 57, wherein the receiver is configured to receive the frame during association with the apparatus.

59. The apparatus of claim 57, wherein the receiver is configured to receive the frame in response to the group indicated by the group identifier changing from corresponding to more than one set of apparatuses to corresponding to only one set of apparatuses.

60. The apparatus of claim 57, wherein the frame comprises a portion for members of the plurality of groups corresponding to only one set of apparatuses and including the apparatus in the only one set, the portion comprising group information for each of the members and the group information comprising:
   a group identification (ID) value; and
   a spatial stream position for the apparatus, the spatial stream position corresponding to the group ID value.

61. The apparatus of claim 60, wherein the frame comprises a field indicating a number of the members in the portion of the frame.

62. The apparatus of claim 57, wherein the frame comprises a field indicating a number of the groups corresponding to more than one set of apparatuses.

63. An apparatus for wireless communications, comprising:
   means for receiving a message indicating whether a group corresponds to only one or to more than one set of apparatuses, wherein each set of apparatuses is configured to receive simultaneous transmissions and wherein the means for receiving is configured to receive a group identifier and a spatial stream position for the apparatus in the group indicated by the group identifier; and
   means for using the spatial stream position to parse the received simultaneous transmissions.

64. The apparatus of claim 63, wherein the message comprises a beacon frame for a wireless local area network (WLAN).

65. The apparatus of claim 63, wherein the group identifier comprises y bits and the message comprises a bitmap having $2^y$ bits with one bit for each of a plurality of groups corresponding to only one or to more than one set of apparatuses.

66. The apparatus of claim 65, wherein the bitmap has a value of 1 for each of the plurality of groups corresponding to more than one set of apparatuses and the bitmap has a value of 0 for each of the plurality of groups corresponding to only one set of apparatuses.

67. The apparatus of claim 66, wherein the bitmap has a value of 0 for each of the plurality of groups that are not used.

68. The apparatus of claim 63, wherein the message indicates that the group indicated by the group identifier has changed from corresponding to only one set of apparatuses to corresponding to more than one set of apparatuses.

69. The apparatus of claim 63, wherein the means for receiving the group identifier and the spatial stream position is configured to receive a frame comprising the group identifier and spatial stream positions for the apparatus, one spatial stream position in each of a plurality of groups including the group indicated by the group identifier.

70. The apparatus of claim 69, wherein the means for receiving is configured to receive the frame during association with the apparatus.

71. The apparatus of claim 69, wherein the means for receiving is configured to receive the frame in response to the group indicated by the group identifier changing from corresponding to more than one set of apparatuses to corresponding to only one set of apparatuses.

72. The apparatus of claim 69, wherein the frame comprises a portion for members of the plurality of groups corresponding to only one set of apparatuses and including the apparatus in the only one set, the portion comprising group information for each of the members and the group information comprising:

a group identification (ID) value; and a spatial stream position for the apparatus, the spatial stream position corresponding to the group ID value.

73. The apparatus of claim 72, wherein the frame comprises a field indicating a number of the members in the portion of the frame.

74. The apparatus of claim 69, wherein the frame comprises a field indicating a number of the groups corresponding to more than one set of apparatuses.

75. A computer-program product for wireless communications, comprising a non-transitory computer-readable medium comprising instructions executable to:

receive, at an apparatus, a message indicating whether a group corresponds to only one or to more than one set of apparatuses, wherein each set of apparatuses is configured to receive simultaneous transmissions;

receive, at the apparatus, a group identifier and a spatial stream position for the apparatus in the group indicated by the group identifier; and use the spatial stream position to parse the received simultaneous transmissions.

76. A wireless node for wireless communication, comprising:

at least one antenna;

a receiver configured to:

receive, at the wireless node via the at least one antenna, a message indicating whether a group corresponds to only one or to more than one set of wireless nodes, wherein each set of wireless nodes is configured to receive simultaneous transmissions; and receive a group identifier and a spatial stream position for the wireless node in the group indicated by the group identifier; and a processing system configured to use the spatial stream position to parse the received simultaneous transmissions.

* * * * *